United States Patent
Scharmann

(10) Patent No.: US 12,415,440 B2
(45) Date of Patent: Sep. 16, 2025

(54) THERMAL EVENT DETECTION AND NOTIFICATION FOR VEHICLE BATTERIES

(71) Applicant: Mercedes-Benz Group AG, Stuttgart (DE)

(72) Inventor: David Scharmann, Charleston, SC (US)

(73) Assignee: Mercedes-Benz Group AG, Stuttgart (DE)

( * ) Notice: Subject to any disclaimer, the term of this patent is extended or adjusted under 35 U.S.C. 154(b) by 219 days.

(21) Appl. No.: 18/333,218

(22) Filed: Jun. 12, 2023

(65) Prior Publication Data

US 2024/0409004 A1 Dec. 12, 2024

(51) Int. Cl.
*B60L 58/24* (2019.01)
*G07C 5/00* (2006.01)

(52) U.S. Cl.
CPC .............. *B60L 58/24* (2019.02); *G07C 5/008* (2013.01); *B60L 2250/16* (2013.01)

(58) Field of Classification Search
CPC .... B60L 58/24; B60L 2250/16; B60L 3/0046; B60L 58/10; B60L 58/12; B60L 2240/545; G07C 5/008
See application file for complete search history.

(56) References Cited

U.S. PATENT DOCUMENTS

| | | | |
|---|---|---|---|
| 10,994,617 B2 | 5/2021 | Asr et al. | |
| 2016/0103188 A1* | 4/2016 | Eifert | G01R 31/392 324/435 |
| 2021/0011509 A1* | 1/2021 | Gossling | A61B 5/11 |
| 2023/0148115 A1* | 5/2023 | Muldoon | H01M 10/4207 701/32.7 |
| 2023/0398872 A1* | 12/2023 | Gilbert-Eyres | G01R 31/396 |
| 2024/0136605 A1* | 4/2024 | Haskara | G01R 31/392 |

FOREIGN PATENT DOCUMENTS

| | | |
|---|---|---|
| CN | 114243139 A | 3/2022 |
| CN | 112731169 B | 8/2022 |
| CN | 115122921 A | 9/2022 |

* cited by examiner

*Primary Examiner* — Rodney A Butler
(74) *Attorney, Agent, or Firm* — Dority & Manning, P.A.

(57) ABSTRACT

Methods, computing systems, and technology for thermal propagation monitoring and notification via air when vehicle is off are presented. For example, a computing system may be configured to obtain, while the vehicle is in an off state, battery data indicative of a state of a battery onboard the vehicle. The computing system may be configured to determine, based on the battery data, an occurrence of a thermal event onboard the vehicle while the vehicle is in the off state. The computing system may be configured to, in response to determining the occurrence of the thermal event, generate a message associated with the battery. The computing system may be configured to output, to one or more computing devices remote from the vehicle, the message associated with the battery.

20 Claims, 10 Drawing Sheets

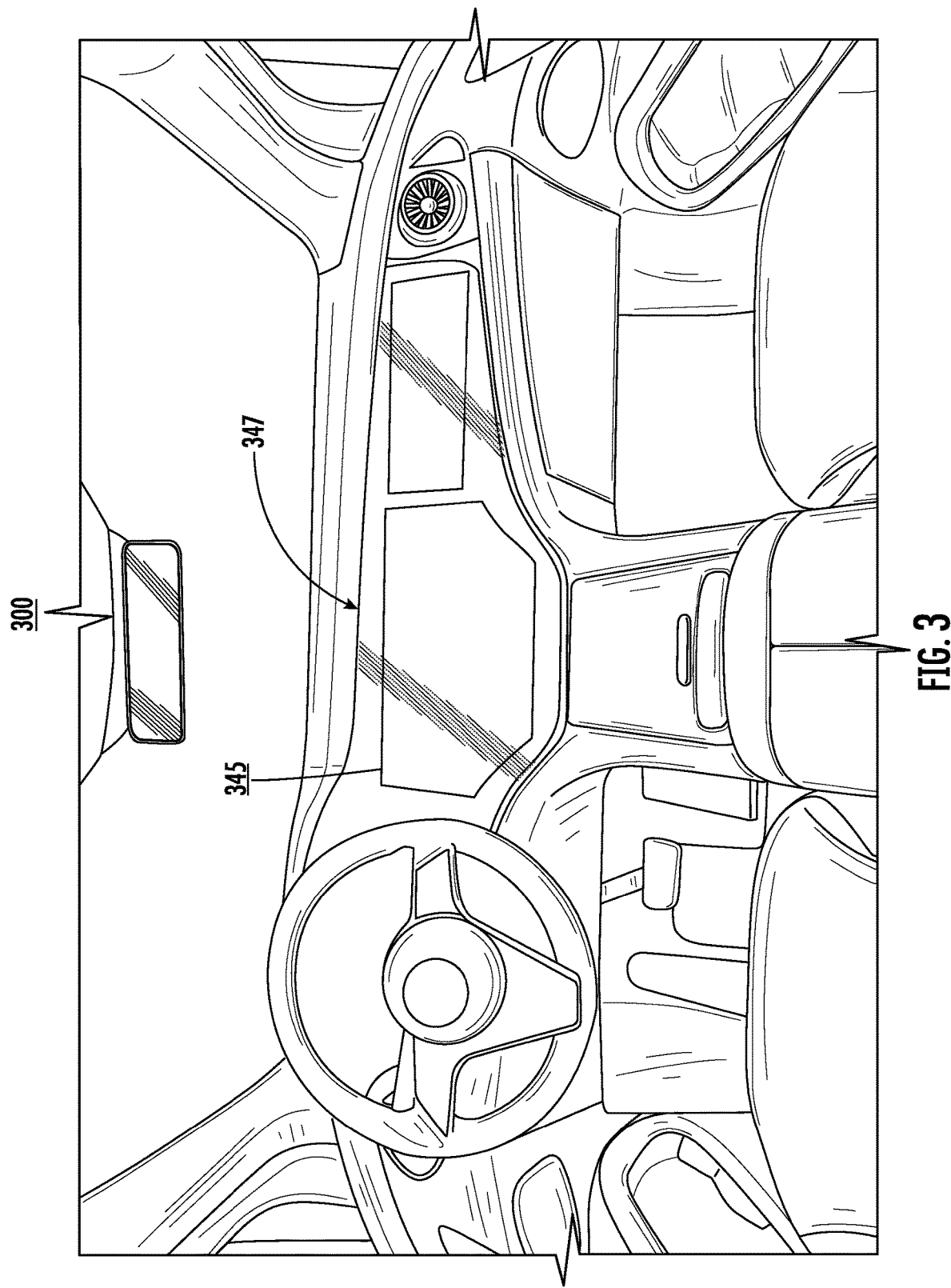

THERMAL EVENT DETECTION AND NOTIFICATION FOR VEHICLE BATTERIES

FIELD

The present disclosure relates generally to enhancing the ability of a vehicle to detect thermal events associated with its batteries. More particularly, the present disclosure relates to monitoring a battery onboard a vehicle while the vehicle is in an off state and sending notifications when a thermal event in the battery occurs.

BACKGROUND

A vehicle such as an electric vehicle can include batteries for operating vehicle functions. For example, fully or hybrid electric vehicles can use batteries to help propel the electric vehicle. Batteries may be subject to thermal events such as thermal runaway. These events can damage a vehicle's battery infrastructure as well as other components of a vehicle.

SUMMARY

Aspects and advantages of implementations of the present disclosure will be set forth in part in the following description, or may be learned from the description, or may be learned through practice of the implementations.

One example aspect of the present disclosure is directed to a computing system of a vehicle. The computing system includes a control circuit configured to obtain, while the vehicle is in an off state, battery data indicative of a state of a battery onboard the vehicle. The control circuit is configured to determine, based on the battery data, an occurrence of a thermal event onboard the vehicle while the vehicle is in the off state. The control circuit is configured to in response to determining the occurrence of the thermal event, generate a message associated with the battery. The control circuit is configured to output, to one or more computing devices remote from the vehicle, the message associated with the battery.

In an example embodiment, the thermal event is a thermal runaway event.

In an example embodiment, the control circuit is further configured to determine that the vehicle has transitioned from an on state to the off state.

In an example embodiment, the vehicle is in a first battery monitoring mode when the vehicle is in the on state and a second battery monitoring mode when the vehicle is in the off state, the second battery monitoring mode being different from the first battery monitoring mode, and the control circuit is configured to output the message associated with the battery to the one or more computing devices remote from the vehicle when the vehicle is in the second battery monitoring mode.

In an example embodiment, the vehicle is in a parked state.

In an example embodiment, the message is indicative of the thermal event.

In an example embodiment, the message is indicative of the state of the battery.

In an example embodiment, the one or more computing devices remote from the vehicle include a plurality of user devices associated with users of the vehicle.

In an example embodiment, the one or more computing devices remote from the vehicle are associated with a vehicle assistance service or an emergency provider.

In an example embodiment, the one or more computing devices remote from the vehicle are included in a computing system onboard another vehicle.

Another example aspect of the present disclosure is directed to a computer-implemented method. The computer-implemented method includes obtaining, while a vehicle is in an off state, battery data indicative of a state of a battery onboard the vehicle. The computer-implemented method includes determining, based on the battery data, an occurrence of a thermal event onboard the vehicle while the vehicle is in the off state. The computer-implemented method includes in response to determining the occurrence of the thermal event, generating a message associated with the battery. The computer-implemented method includes outputting, to one or more computing devices remote from the vehicle, the message associated with the battery.

In an embodiment, the computer-implemented method includes determining that the vehicle has transitioned from an on state to the off state.

In an embodiment, the computer-implemented method includes: predicting that the thermal event will occur; and outputting, to the one or more computing devices remote from the vehicle, an initial message indicating that the thermal event is predicted to occur.

In an embodiment, the method includes outputting a signal to transition the vehicle to an on state or an awake state.

In an embodiment, the one or more computing devices remote from the vehicle include at least one of: (i) a user device, (ii) a computing device associated with a vehicle assistance service, or (iii) a computing device associated with an emergency provider.

In an embodiment, the one or more computing devices remote from the vehicle include a plurality of user devices associated with users of the vehicle.

In an embodiment, the vehicle is being transported by another vehicle, and the one or more computing devices remote from the vehicle include a computing device onboard the other vehicle or a user device of an operator of the other vehicle.

In an embodiment, the message is indicative of at least one of: (i) the thermal event, or (ii) the state of the battery.

In an embodiment, the message is indicative of a location of the vehicle.

Yet another example aspect of the present disclosure is directed to one or more non-transitory computer-readable media that store instructions that are executable by a control circuit to: obtain, while a vehicle is in an off state, battery data indicative of a state of a battery onboard the vehicle; determine, based on the battery data, an occurrence of a thermal event onboard the vehicle while the vehicle is in the off state; in response to determining the occurrence of the thermal event, generate a message associated with the battery; and output, to one or more computing devices remote from the vehicle, the message associated with the battery.

Other example aspects of the present disclosure are directed to other systems, methods, vehicles, apparatuses, tangible non-transitory computer-readable media, and devices for the technology described herein.

These and other features, aspects, and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which:

FIG. 3 illustrates an example vehicle interior with an example display according to an embodiment hereof.

DETAILED DESCRIPTION

Figure 1:
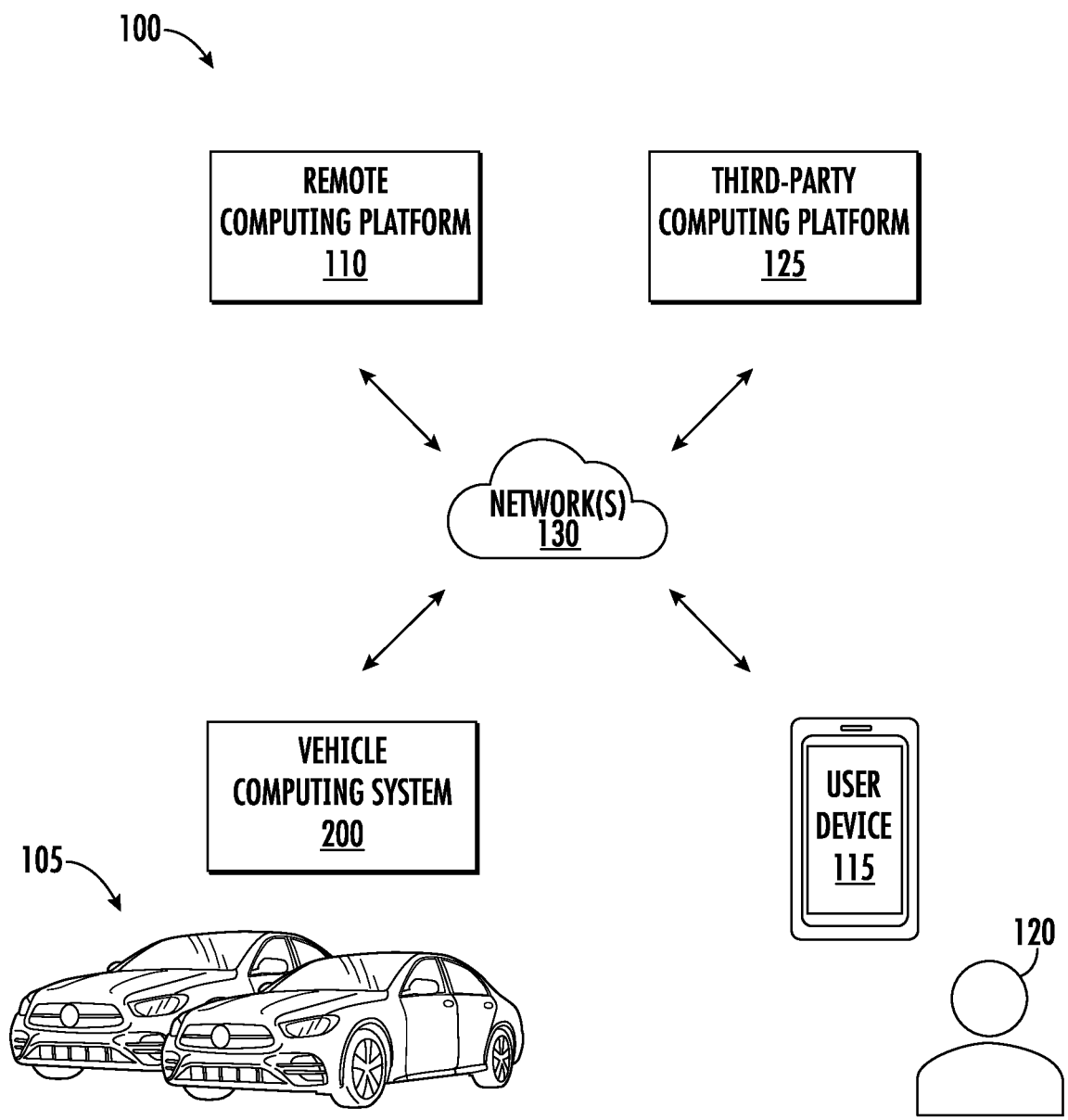
FIG. 1 illustrates an example computing ecosystem according to an embodiment hereof.

Example aspects of the present disclosure are directed to monitoring a vehicle battery for the occurrence of a thermal event while the vehicle is in an off state and broadcasting a related message to remote computing devices. For example, a thermal event that may occur is thermal runaway, where the temperature of a battery cell increases uncontrollably. Other thermal events may include an internal short circuit, deformation, penetration, vibration, dendrites, articles, an external short circuit, over voltage, overcharge, over discharge, overcurrent, or external heating in a battery cell, as non-limiting examples. In some circumstances, these thermal events may lead to a thermal runaway of a battery.

Thermal runaway, or another thermal event of the battery, can damage components of the vehicle as well as objects around the vehicle. For instance, thermal runaway can lead to thermal propagation when the thermal runaway in one battery cell spreads to other battery cells of the battery, causing a fire in the vehicle.

The technology of the present disclosure allows for monitoring a vehicle battery, determining that a thermal event, such as thermal runaway, has occurred while the vehicle is in the off state, and generating a message in response to determining that the thermal event occurred. For example, the vehicle may be parked with passengers inside or outside the vehicle. The battery can be monitored while the vehicle is parked and in an off state. A vehicle may be considered to be in an off state when the vehicle is not turned on, powered on, etc. A thermal event can be detected while the vehicle is parked and in an off state.

A signal indicating that the thermal event occurred can be utilized to share information about the thermal event to computing devices outside the vehicle. For instance, in response to determining that the thermal event occurred, a message about the thermal event can be generated and sent to the vehicle passengers or users that are remote from the vehicle (e.g., a vehicle owner that is away from the vehicle). As a result, the vehicle passengers and users that are remote from the vehicle can take an appropriate action.

The message may include information about the thermal event and the state of the vehicle battery, such as information indicating that thermal runaway is occurring in the vehicle battery. The message may also include information that identifies the location of the vehicle. The message can be output to computing devices that are outside of the vehicle. For example, the message can be sent over the air to user devices (e.g., the driver's phone and/or the passengers' phones) and computing devices (e.g., computers, phones, laptops, tablets, wearable devices, etc.) associated with emergency providers, vehicle assistance services, or another entity associated with the vehicle (e.g., maintenance provider, monitoring service). In some examples, the message can be sent over the air to computing devices onboard another vehicle where the message can be displayed on an instrument cluster in a vehicle that is nearby the vehicle experiencing the thermal event.

The present disclosure provides a number of technical effects and computing improvements. For instance, the systems and methods of the present disclosure can increase the battery monitoring capabilities of the computing systems onboard the vehicle by continuously monitoring a battery of a vehicle. The computing systems can monitor the vehicle battery when the vehicle is in an on state and when the vehicle is in an off state. As such, the technology of the present disclosure improves the ability of the vehicle to determine that a thermal event has occurred at any time. This may be particularly useful when the vehicle is parked and in an off state and there are passengers in the vehicle who need to exit the vehicle if a thermal event occurs. This may also help avoid extensive damage caused by a thermal event by allowing possible mitigation from a user or remote service that is not within/onboard the vehicle.

The technology of the present disclosure also improves the computing systems onboard the vehicle. For instance, signals generated while monitoring the battery can be utilized by the computing systems onboard the vehicle when the vehicle is in an on state and when the vehicle is in an off state. The signals can also be broadcast to other computing devices when the vehicle is on or when the vehicle is off. For example, the computing systems can use a signal generated while monitoring the battery when the vehicle is off to generate a message about the state of the battery and send the message to computing devices used by the users of the vehicle, emergency services, vehicle assistance services, and/or other vehicles. Accordingly, the vehicle computing system can avoid wasting its own computing resources by using and broadcasting the signals that are generated while the battery is monitored both when the vehicle is on and when the vehicle is off. In this way, the vehicle computing system can more efficiently utilize its computing resources.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations may be made to the embodiments without departing from the scope or spirit of the present disclosure. For instance, features illustrated or described as part of one embodiment may be used with another embodiment to yield a still further embodiment. Thus, it is intended that aspects of the present disclosure cover such modifications and variations.

The technology of the present disclosure may include the collection of data associated with a user in the event that the user expressly authorizes such collection. Such authorization may be provided by the user via explicit user input to a user interface in response to a prompt that expressly requests such authorization. Collected data may be anonymized, pseudonymized, encrypted, noised, securely stored, or otherwise protected. A user may opt out of such data collection at any time.

FIG. 1 illustrates an example computing ecosystem 100 according to an embodiment hereof. The ecosystem 100 may include a vehicle 105, a remote computing platform 110 (also referred to herein as computing platform 110), and a user device 115 associated with a user 120. The user 120 may be a driver of the vehicle. In some implementations, the user 120 may be a passenger of the vehicle. In some implementations, the computing ecosystem 100 may include a third party (3P) computing platform 125, as further described herein. The vehicle 105 may include a vehicle computing system 200 located onboard the vehicle 105. The computing platform 110, the user device 115, the third-party computing platform 125, and/or the vehicle computing system 200 may be configured to communicate with one another via one or more networks 130.

The systems/devices of ecosystem 100 may communicate using one or more application programming interfaces (APIs). This may include external facing APIs to communicate data from one system/device to another. The external facing APIs may allow the systems/devices to establish secure communication channels via secure access channels over the networks 130 through any number of methods, such as web-based forms, programmatic access via RESTful APIs, Simple Object Access Protocol (SOAP), remote procedure call (RPC), scripting access, etc.

The computing platform 110 may include a computing system that is remote from the vehicle 105. In an embodiment, the computing platform 110 may include a cloud-based server system. The computing platform 110 may be associated with (e.g., operated by) an entity. For example, the remote computing platform 110 may be associated with an OEM that is responsible for the make and model of the vehicle 105. In another example, the remote computing platform 110 may be associated with a service entity contracted by the OEM to operate a cloud-based server system that provides computing services to the vehicle 105.

The computing platform 110 may include one or more back-end services for supporting the vehicle 105. The services may include, for example, tele-assist services, navigation/routing services, performance monitoring services, etc. The computing platform 110 may host or otherwise include one or more APIs for communicating data to/from a vehicle computing system 200 of the vehicle 105 or the user device 115.

The computing platform 110 may include one or more computing devices. For instance, the computing platform 110 may include a control circuit and a non-transitory computer-readable medium (e.g., memory). The control circuit of the computing platform 110 may be configured to perform the various operations and functions described herein. Further description of the computing hardware and components of computing platform 110 is provided herein with reference to other figures.

The user device 115 may include a computing device owned or otherwise accessible to the user 120. For instance, the user device 115 may include a phone, laptop, tablet, wearable device (e.g., smart watch, smart glasses, headphones), personal digital assistant, gaming system, personal desktop devices, other hand-held devices, or other types of mobile or non-mobile user devices. As further described herein, the user device 115 may include one or more input components such as buttons, a touch screen, a joystick or other cursor control, a stylus, a microphone, a camera or other imaging device, a motion sensor, etc. The user device 115 may include one or more output components such as a display device (e.g., display screen), a speaker, etc. In an embodiment, the user device 115 may include a component such as, for example, a touchscreen, configured to perform input and output functionality to receive user input and present information for the user 120. The user device 115 may execute one or more instructions to run an instance of a software application and present user interfaces associated therewith, as further described herein. In an embodiment, the launch of a software application may initiate a user-network session with the computing platform 110.

The third-party computing platform 125 may include a computing system that is remote from the vehicle 105, remote computing platform 110, and user device 115. In an embodiment, the third-party computing platform 125 may include a cloud-based server system. The term "third-party entity" may be used to refer to an entity that is different than the entity associated with the remote computing platform 110. For example, as described herein, the remote computing platform 110 may be associated with an OEM that is responsible for the make and model of the vehicle 105. The third-party computing platform 125 may be associated with a supplier of the OEM, a maintenance provider, a mapping service provider, an emergency provider, or other types of entities. In another example, the third-party computing platform 125 may be associated with an entity that owns, operates, manages, etc. a software application that is available to or downloaded on the vehicle computing system 200.

The third-party computing platform 125 may include one or more back-end services provided by a third-party entity. The third-party computing platform 125 may provide services that are accessible by the other systems and devices of the ecosystem 100. The services may include, for example, mapping services, routing services, search engine functionality, maintenance services, entertainment services (e.g., music, video, images, gaming, graphics), emergency services (e.g., roadside assistance, 911 support), or other types of services. The third-party computing platform 125 may host or otherwise include one or more APIs for communicating data to/from the third-party computing platform 125 to other systems/devices of the ecosystem 100.

The networks 130 may be any type of network or combination of networks that allows for communication between devices. In some implementations, the networks 130 may include one or more of a local area network, wide area network, the Internet, secure network, cellular network, mesh network, peer-to-peer communication link or some combination thereof and may include any number of wired or wireless links. Communication over the networks 130 may be accomplished, for instance, via a network interface using any type of protocol, protection scheme, encoding, format, packaging, etc. In an embodiment, communication between the vehicle computing system 200 and the user device 115 may be facilitated by near field or short-range communication techniques (e.g., Bluetooth low energy protocol, radio frequency signaling, NFC protocol).

The vehicle 105 may be a vehicle that is operable by the user 120. In an embodiment, the vehicle 105 may be an automobile or another type of ground-based vehicle that is manually driven by the user 120. For example, the vehicle 105 may be a Mercedes-Benz® car or van. In some implementations, the vehicle 105 may be an aerial vehicle (e.g., a personal airplane) or a water-based vehicle (e.g., a boat). The vehicle 105 may include operator-assistance functionality such as cruise control, advanced driver assistance systems, etc. In some implementations, the vehicle 105 may be a fully or semi-autonomous vehicle.

The vehicle 105 may include a powertrain and one or more power sources. The powertrain may include a motor (e.g., an internal combustion engine, electric motor, or hybrid thereof), e-motor (e.g., electric motor), transmission (e.g., automatic, manual, continuously variable), driveshaft, axles, differential, e-components, gear, etc. The power sources may include one or more types of power sources. For example, the vehicle 105 may be a fully electric vehicle (EV) that is capable of operating a powertrain of the vehicle 105 (e.g., for propulsion) and the vehicle's onboard functions using electric batteries. In an embodiment, the vehicle 105 may use combustible fuel. In an embodiment, the vehicle 105 may include hybrid power sources such as, for example, a combination of combustible fuel and electricity.

The vehicle 105 may include a vehicle interior. The vehicle interior may include the area inside of the body of the vehicle 105 including, for example, a cabin for users of the vehicle 105. The interior of the vehicle 105 may include seats for the users, a steering mechanism, accelerator interface, braking interface, etc. The interior of the vehicle 105 may include a display device such as a display screen associated with an infotainment system, as further described with respect to FIG. 3.

The vehicle 105 may include a vehicle exterior. The vehicle exterior may include the outer surface of the vehicle 105. The vehicle exterior may include one or more lighting elements (e.g., headlights, brake lights, accent lights). The vehicle 105 may include one or more doors for accessing the vehicle interior by, for example, manipulating a door handle of the vehicle exterior. The vehicle 105 may include one or more windows, including a windshield, door windows, passenger windows, rear windows, sunroof, etc.

The systems and components of the vehicle 105 may be configured to communicate via a communication channel. The communication channel may include one or more data buses (e.g., controller area network (CAN)), on-board diagnostics connector (e.g., OBD-II), or a combination of wired or wireless communication links. The onboard systems may send or receive data, messages, signals, etc. amongst one another via the communication channel.

In an embodiment, the communication channel may include a direct connection, such as a connection provided via a dedicated wired communication interface, such as a RS-232 interface, a universal serial bus (USB) interface, or via a local computer bus, such as a peripheral component interconnect (PCI) bus. In an embodiment, the communication channel may be provided via a network. The network may be any type or form of network, such as a personal area network (PAN), a local-area network (LAN), Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the systems/devices of the vehicle 105 may communicate via an intermediate storage device, or more generally an intermediate non-transitory computer-readable medium. For example, the non-transitory computer-readable medium, which may be external to the vehicle computing system 200, may act as an external buffer or repository for storing information. In such an example, the vehicle computing system 200 may retrieve or otherwise receive the information from the non-transitory computer-readable medium.

Certain routine and conventional components of vehicle 105 (e.g., an engine) are not illustrated and/or discussed herein for the purpose of brevity. One of ordinary skill in the art will understand the operation of conventional vehicle components in vehicle 105.

The vehicle 105 may include a vehicle computing system 200. As described herein, the vehicle computing system 200 is onboard the vehicle 105. For example, the computing devices and components of the vehicle computing system 200 may be housed, located, or otherwise included on or within the vehicle 105. The vehicle computing system 200 may be configured to execute the computing functions and operations of the vehicle 105.

Figure 2A:
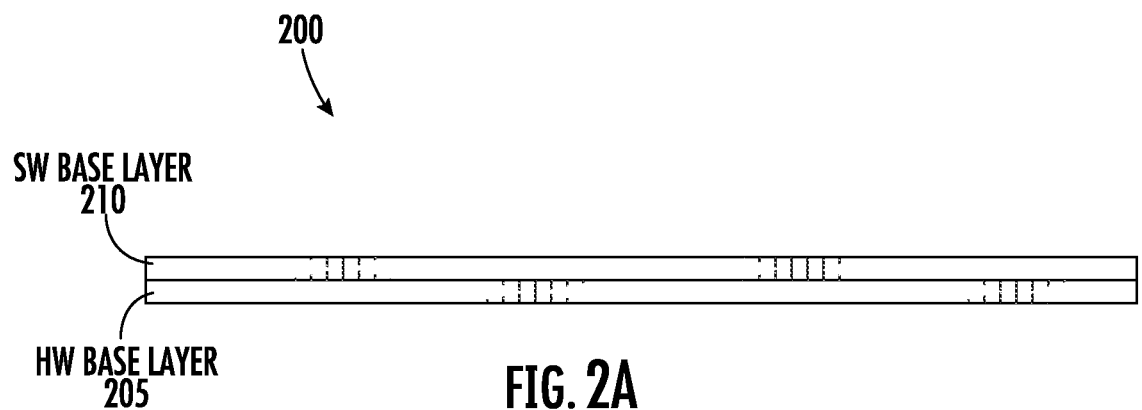
FIGS. 2A-D illustrate diagrams of an example computing architecture for an onboard computing system of a vehicle according to an embodiment hereof.

FIG. 2A illustrates an overview of an operating system of the vehicle computing system 200. The operating system may be a layered operating system. The vehicle computing system 200 may include a hardware layer 205 and a software layer 210. The hardware and software layers 205, 210 may include sub-layers. In some implementations, the operating system of the vehicle computing system 200 may include other layers (e.g., above, below, or in between those shown in FIG. 2A). In an example, the hardware layer 205 and the software layer 210 can be standardized base layers of the vehicle's operating system.

Figure 2B:
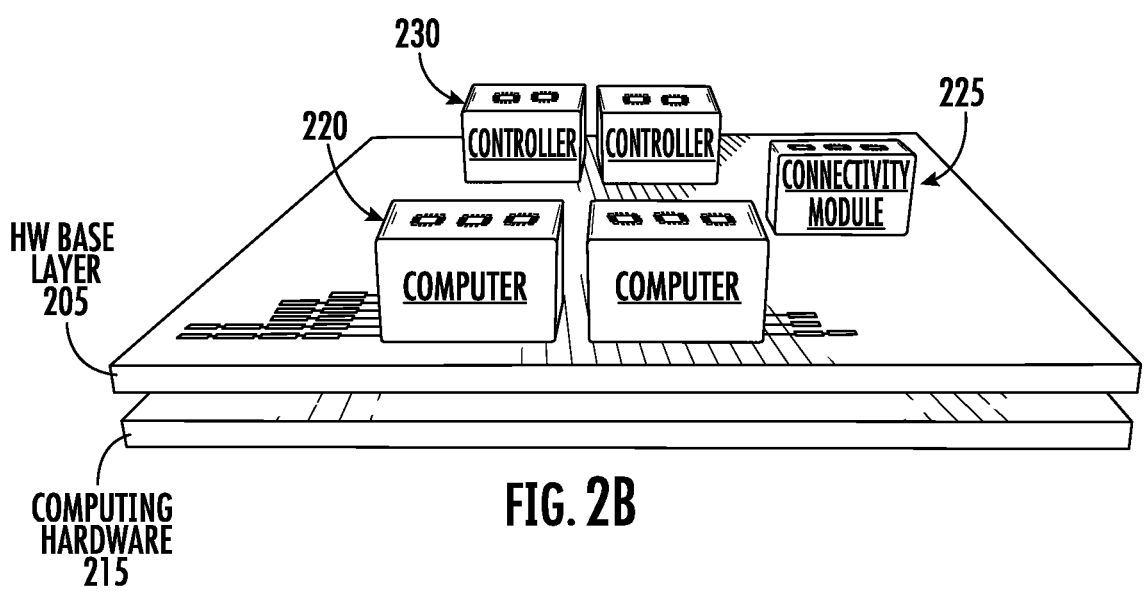

FIG. 2B illustrates a diagram of the hardware layer 205 of the vehicle computing system 200. In the layered operating system of the vehicle computing system 200, the hardware layer 205 can reside between the physical computing hardware 215 onboard the vehicle 105 and the software (e.g., of software layer 210) that runs onboard the vehicle 105.

The hardware layer 205 may be an abstraction layer including computing code that allows for communication between the software and the computing hardware 215 in the vehicle computing system 200. For example, the hardware layer 205 may include interfaces and calls that allow the vehicle computing system 200 to generate a hardware-dependent instruction to the computing hardware 215 (e.g., processors, memories, etc.) of the vehicle 105.

The hardware layer 205 may be configured to help coordinate the hardware resources. The architecture of the hardware layer 205 may be service oriented. The services may help provide the computing capabilities of the vehicle computing system 200. For instance, the hardware layer 205 may include the domain computers 220 of the vehicle 105, which may host various functionality of the vehicle 105 such as the vehicle's intelligent functionality. The specification of each domain computer may be tailored to the functions and the performance requirements where the services are abstracted to the domain computers. By way of example, this permits certain processing resources (e.g., graphical processing units) to support the functionality of a central in-vehicle infotainment computer for rendering graphics across one or more display devices for navigation, games, etc. or to support an intelligent automated driving computer to achieve certain industry assurances.

The hardware layer 205 may be configured to include a connectivity module 225 for the vehicle computing system

200. The connectivity module 225 may include code/instructions for interfacing with the communications hardware of the vehicle 105. This can include, for example, interfacing with a communications controller, receiver, transceiver, transmitter, port, conductors, or other hardware for communicating data/information. The connectivity module 225 may allow the vehicle computing system 200 to communicate with other computing systems that are remote from the vehicle 105 including, for example, remote computing platform 110 (e.g., an OEM cloud platform).

The architecture design of the hardware layer 205 may be configured for interfacing with the computing hardware 215 for one or more vehicle control units 230. The vehicle control units 230 may be configured for controlling various functions of the vehicle 105. This may include, for example, a central exterior and interior controller (CEIC), a charging controller, or other controllers as further described herein.

Figure 2C:
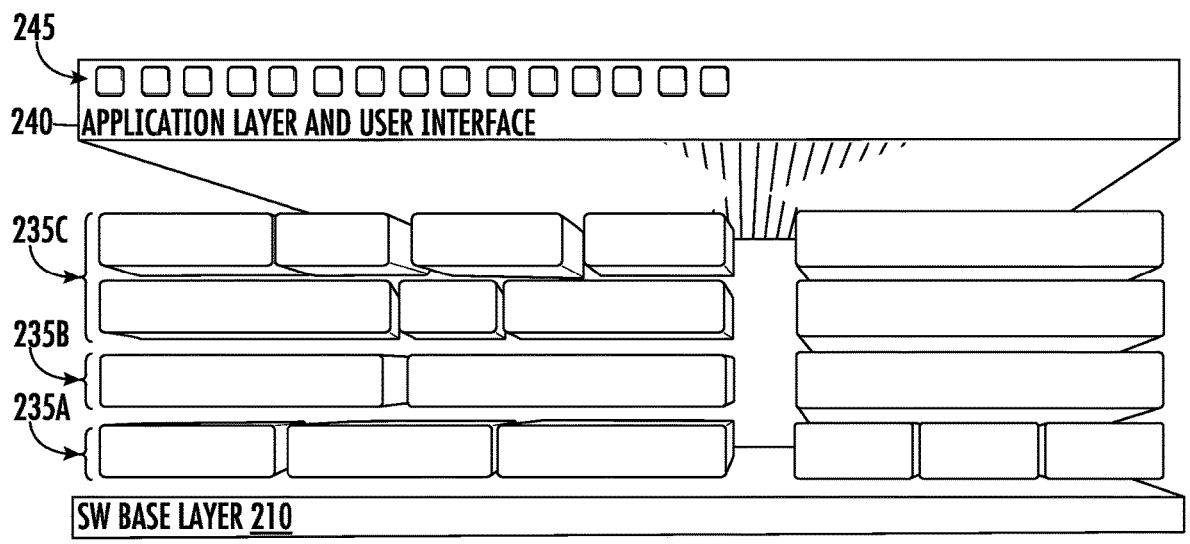

The software layer 210 may be configured to provide software operations for executing various types of functionality and applications of the vehicle 105. FIG. 2C illustrates a diagram of the software layer 210 of the vehicle computing system 200. The architecture of the software layer 210 may be service oriented and may be configured to provide software for various functions of the vehicle computing system 200. To do so, the software layer 210 may include a plurality of sublayers 235A-C. For instance, the software layer 210 may include a first sublayer 235A including firmware (e.g., audio firmware) and a hypervisor, a second sublayer 235B including operating system components (e.g., open-source components), and a third sublayer 235C including middleware (e.g., for flexible integration with applications developed by an associated entity or third-party entity).

The vehicle computing system 200 may include an application layer 240. The application layer 240 may allow for integration with one or more software applications 245 that are downloadable or otherwise accessible by the vehicle 105. The application layer 240 may be configured, for example, using container interfaces to integrate with applications developed by a variety of different entities.

Figure 2D:
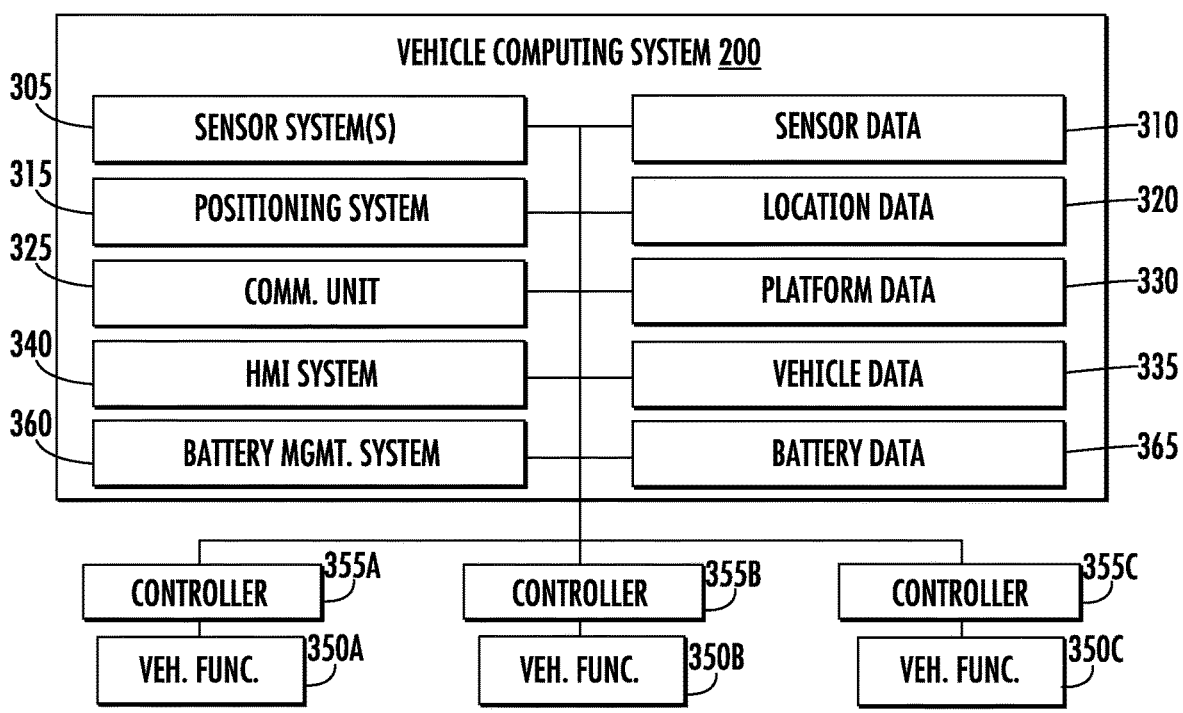

The layered operating system and the vehicle's onboard computing resources may allow the vehicle computing system 200 to collect and communicate data as well as operate the systems implemented onboard the vehicle 105. FIG. 2D illustrates a block diagram of example systems and data of the vehicle 105.

The vehicle 105 may include one or more sensor systems 305. A sensor system may include or otherwise be in communication with a sensor of the vehicle 105 and a module for processing sensor data 310 associated with the sensor configured to acquire the sensor data 310. This may include sensor data 310 associated with the surrounding environment of the vehicle 105, sensor data associated with the interior of the vehicle 105, or sensor data associated with a particular vehicle function. The sensor data 310 may be indicative of conditions observed in the interior of the vehicle, exterior of the vehicle, or in the surrounding environment. For instance, the sensor data 310 may include image data, inside/outside temperature data, weather data, data indicative of a position of a user/object within the vehicle 105, weight data, motion/gesture data, audio data, or other types of data. The sensors may include one or more: cameras (e.g., visible spectrum cameras, infrared cameras), motion sensors, audio sensors (e.g., microphones), weight sensors (e.g., for a vehicle a seat), temperature sensors, humidity sensors, Light Detection and Ranging (LIDAR) systems, Radio Detection and Ranging (RADAR) systems, or other types of sensors. The vehicle 105 may include other sensors configured to acquire data associated with the vehicle 105. For example, the vehicle 105 may include inertial measurement units, wheel odometry devices, or other sensors.

The vehicle 105 may include a positioning system 315. The positioning system 315 may be configured to generate location data 320 (also referred to as position data) indicative of a location (also referred to as a position) of the vehicle 105. For example, the positioning system 315 may determine location by using one or more of inertial sensors (e.g., inertial measurement units, etc.), a satellite positioning system, based on IP address, by using triangulation and/or proximity to network access points or other network components (e.g., cellular towers, WiFi access points, etc.), or other suitable techniques. The positioning system 315 may determine a current location of the vehicle 105. The location may be expressed as a set of coordinates (e.g., latitude, longitude), an address, a semantic location (e.g., "at work"), etc.

In an embodiment, the positioning system 315 may be configured to localize the vehicle 105 within its environment. For example, the vehicle 105 may access map data that provides detailed information about the surrounding environment of the vehicle 105. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), or other traffic signals or control devices/markings (e.g., cross walks)); or any other data. The positioning system 315 may localize the vehicle 105 within the environment (e.g., across multiple axes) based on the map data. For example, the positioning system 315 may process certain sensor data 310 (e.g., LIDAR data, camera data, etc.) to match it to a map of the surrounding environment to get an understanding of the vehicle's position within that environment. The determined position of the vehicle 105 may be used by various systems of the vehicle computing system 200 or another computing system (e.g., the remote computing platform 110, the third-party computing platform 125, the user device 115).

The vehicle 105 may include a communications unit 325 configured to allow the vehicle 105 (and its vehicle computing system 200) to communicate with other computing devices. The vehicle computing system 200 may use the communications unit 325 to communicate with the remote computing platform 110 or one or more other remote computing devices over a network 130 (e.g., via one or more wireless signal connections). For example, the vehicle computing system 200 may utilize the communications unit 325 to receive platform data 330 from the computing platform 110. This may include, for example, an over-the-air (OTA) software update for the operating system of the vehicle computing system 200. Additionally, or alternatively, the vehicle computing system 200 may utilize the communications unit 325 to send vehicle data 335 to the computing platform 110. The vehicle data 335 may include any data acquired onboard the vehicle including, for example, sensor data 310, location data 320, diagnostic data, user input data, data indicative of current software versions or currently running applications, occupancy data, data associated with the user 120 of the vehicle 105, or other types of data obtained (e.g., acquired, accessed, generated, downloaded, etc.) by the vehicle computing system 200.

In some implementations, the communications unit 325 may allow communication among one or more of the systems on-board the vehicle 105.

In an embodiment, the communications unit 325 may be configured to allow the vehicle 105 to communicate with or otherwise receive data from the user device 115 (shown in FIG. 1). The communications unit 325 may utilize various communication technologies such as, for example, Bluetooth low energy protocol, radio frequency signaling, or other short range or near filed communication technologies. The communications unit 325 may include any suitable components for interfacing with one or more networks, including, for example, transmitters, receivers, ports, controllers, antennas, or other suitable components that may help facilitate communication.

The vehicle 105 may include one or more human-machine interfaces (HMIs) 340. The human-machine interfaces 340 may include a display device, as described herein. The display device (e.g., touchscreen) may be viewable by a user of the vehicle 105 (e.g., user 120) that is located in the front of the vehicle 105 (e.g., driver's seat, front passenger seat). Additionally, or alternatively, a display device (e.g., rear unit) may be viewable by a user that is located in the rear of the vehicle 105 (e.g., back passenger seats). The human-machine interfaces 340 may present content via a user interface for display to a user 120.

The vehicle 105 may include a battery management system 360. The battery management system 360 may monitor one or more batteries used by the vehicle 105. The battery management system 360 may be configured to obtain battery data 365 related to the one or more batteries used by the vehicle 105. The battery data 365 may include a charge level, voltage, capacity, leakage, gas levels, internal resistance, and temperature of a battery and the cells of a battery, as well as the state of the battery case, as non-limiting examples. The battery data 365 may be used by various systems of the vehicle computing system 200 or another computing system (e.g., the remote computing platform 110, the third-party computing platform 125, the user device 115). For example, the vehicle computing system 200 may utilize the communications unit 325 to send the battery data 365 to the user device 115.

FIG. 3 illustrates an example vehicle interior 300 with a display device 345. The display device 345 may be a component of the vehicle's head unit or infotainment system. Such a component may be referred to as a display device of the infotainment system or be considered as a device for implementing an embodiment that includes the use of an infotainment system. For illustrative and example purposes, such a component may be referred to herein as a head unit display device (e.g., positioned in a front/dashboard area of the vehicle interior), a rear unit display device (e.g., positioned in the back passenger area of the vehicle interior), an infotainment head unit or rear unit, or the like. The display device 345 may be located on, form a portion of, or function as a dashboard of the vehicle 105. The display device 345 may include a display screen, CRT, LCD, plasma screen, touch screen, TV, projector, tablet, and/or other suitable display components.

The display device may display a variety of content to the user 120 including information about the vehicle 105, prompts for user input, etc. The display device may include a touchscreen through which the user 120 may provide user input to a user interface.

For example, the display device 345 may include user interface rendered via a touch screen that presents various content. The content may include vehicle speed, mileage, fuel level, charge range, navigation/routing information, audio selections, streaming content (e.g., video/image content), internet search results, comfort settings (e.g., temperature, humidity, seat position, seat massage), or other vehicle data 335. The display device 345 may render content to facilitate the receipt of user input. For instance, the user interface of the display device 345 may present one or more soft buttons with which a user 120 can interact to adjust various vehicle functions (e.g., navigation, audio/streaming content selection, temperature, seat position, seat massage, etc.). Additionally, or alternatively, the display device 345 may be associated with an audio input device (e.g., microphone) for receiving audio input from the user 120.

Returning to FIG. 2D, the vehicle 105 may include a plurality of vehicle functions 350A-C. A vehicle function 350A-C may be a functionality that the vehicle 105 is configured to perform based on a detected input. The vehicle functions 350A-C may include one or more: (i) vehicle comfort functions; (ii) vehicle staging functions; (iii) vehicle climate functions; (vi) vehicle navigation functions; (v) drive style functions; (v) vehicle parking functions; or (vi) vehicle entertainment functions. The user 120 may interact with a vehicle function 350A-C through user input (e.g., to an adjustable input device, UI element) that specifies a setting of the vehicle function 350A-C selected by the user.

Each vehicle function may include a controller 355A-C associated with that particular vehicle function 350A-C. The controller 355A-C for a particular vehicle function may include control circuitry configured to operate its associated vehicle function 350A-C. For example, a controller may include circuitry configured to turn the seat heating function on, to turn the seat heating function off, set a particular temperature or temperature level, etc.

In an embodiment, a controller 355A-C for a particular vehicle function may include or otherwise be associated with a sensor that captures data indicative of the vehicle function being turned on or off, a setting of the vehicle function, etc. For example, a sensor may be an audio sensor or a motion sensor. The audio sensor may be a microphone configured to capture audio input from the user 120. For example, the user 120 may provide a voice command to activate the radio function of the vehicle 105 and request a particular station. The motion sensor may be a visual sensor (e.g., camera), infrared, RADAR, etc. configured to capture a gesture input from the user 120. For example, the user 120 may provide a hand gesture motion to adjust a temperature function of the vehicle 105 to lower the temperature of the vehicle interior.

The controllers 355A-C may be configured to send signals to another onboard system. The signals may encode data associated with a respective vehicle function. The encoded data may indicate, for example, a function setting, timing, etc. In an example, such data may be used to generate content for presentation via the display device 345 (e.g., showing a current setting). Additionally, or alternatively, such data can be included in vehicle data 335 and transmitted to the computing platform 110.

Figure 4:
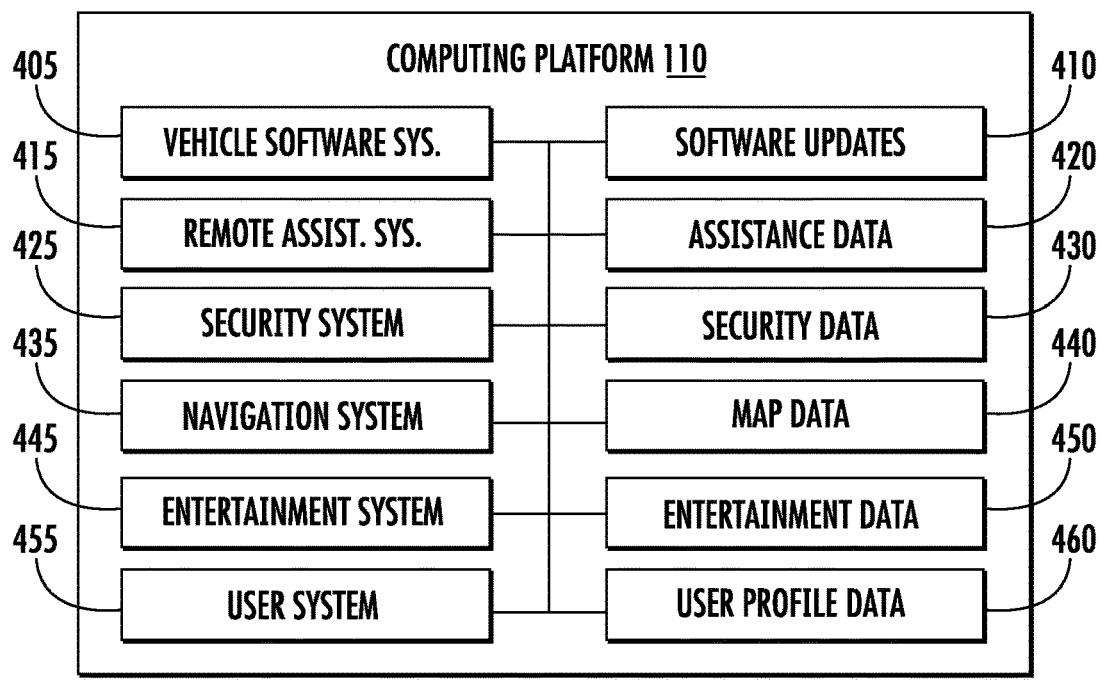
FIG. 4 illustrates a diagram of an example computing platform that is remote from a vehicle according to an embodiment hereof.

FIG. 4 illustrates a diagram of computing platform 110, which is remote from a vehicle according to an embodiment hereof. As described herein, the computing platform 110 may include a cloud-based computing platform. The computing platform 110 may be implemented on one or more servers and include, or otherwise have access to, one or more databases. In an example, the computing platform 110 may be implemented using different servers based on geographic region.

In some implementations, the computing platform 110 may include layered infrastructure that includes a plurality of layers. For instance, the computing platform 110 may include a cloud-based layer associated with functions such as security, automation, monitoring, and resource management. The computing platform 110 may include a cloud application platform layer associated with functions such as charging station functions, live traffic, vehicle functions, vehicle-sharing functions, etc. The computing platform 110 may include applications and services that are built on these layers.

The computing platform 110 may be a modular connected service platform that includes a plurality of services that are available to the vehicle 105. In an example, the computing platform 110 may include a container-based micro-services mesh platform. The services can be represented or implemented as systems within the computing platform 110.

In an example, the computing platform 110 may include a vehicle software system 405 that is configured to provide the vehicle 105 with one or more software updates 410. The vehicle software system 405 can maintain a data structure (e.g., list, table) that indicates the current software or versions thereof downloaded to a particular vehicle. The vehicle software system 405 may also maintain a data structure indicating software packages or versions that are to be downloaded by the particular vehicle. In some implementations, the vehicle software system 405 may maintain a data structure that indicates the computing hardware, charging hardware, or other hardware resources onboard a particular vehicle. These data structures can be organized by vehicle identifier (e.g., VIN) such that the computing platform 110 can perform a look-up function, based on the vehicle identifier, to determine the associated software (and updates) for a particular vehicle.

When the vehicle 105 is connected to the computing platform 110 and is available to update its software, the vehicle 105 can request a software update from the computing platform. The computing platform 110 can provide the vehicle 105 one or more software updates 410 as over-the-air software updates via a network 130.

The computing platform 110 may include a remote assistance system 415. The remote assistance system 415 may provide assistance to the vehicle 105. This can include providing information to the vehicle 105 to assist with charging (e.g., charging locations recommendations), remotely controlling the vehicle (e.g., for AV assistance), roadside assistance (e.g., for collisions, flat tires), etc. The remote assistance system 415 may obtain assistance data 420 to provide its core functions. The assistance data 420 may include information that may be helpful for the remote assistance system 415 to assist the vehicle 105. This may include information related to the vehicle's current state, an occupant's current state, the vehicle's location, the vehicle's route, charge/fuel level, incident data, etc. In some implementations, the assistance data 420 may include the vehicle data 335.

The remote assistance system 415 may transmit data or command signals to provide assistance to the vehicle 105. This may include providing data indicative of relevant charging locations, remote control commands to move the vehicle, connect to an emergency provider, etc.

The computing platform 110 may include a security system 425. The security system 425 can be associated with one or more security-related functions for accessing the computing platform 110 or the vehicle 105. For instance, the security system 425 can process security data 430 for identifying digital keys, data encryption, data decryption, etc. for accessing the services/systems of the computing platform 110. Additionally, or alternatively, the security system 425 can store security data 430 associated with the vehicle 105. A user 120 can request access to the vehicle 105 (e.g., via the user device 115). In the event the request includes a digital key for the vehicle 105 as indicated in the security data 430, the security system 425 can provide a signal to lock (or unlock) the vehicle 105.

The computing platform 110 may include a navigation system 435 that provides a back-end routing and navigation service for the vehicle 105. The navigation system 435 may provide map data 440 to the vehicle 105. The map data 440 may be utilized by the positioning system 315 of the vehicle 105 to determine a location of the vehicle 105, a point of interest, etc. The navigation system 435 may also provide routes to destinations requested by the vehicle 105 (e.g., via user input to the vehicle's head unit). The routes can be provided as a portion of the map data 440 or as separate routing data. Data provided by the navigation system 435 can be presented as content on the display device 345 of the vehicle 105.

The computing platform 110 may include an entertainment system 445. The entertainment system 445 may access one or more databases for entertainment data 450 for a user 120 of the vehicle 105. In some implementations, the entertainment system 445 may access entertainment data 450 from another computing system (e.g., via an API) associated with a third-party service provider of entertainment content. The entertainment data 450 may include media content such as music, videos, gaming data, etc. The vehicle 105 may output the entertainment data 450 via one or more output devices of the vehicle 105 (e.g., display device, speaker, etc.).

The computing platform 110 may include a user system 455. The user system 455 may create, store, manage, or access user profile data 460. The user profile data 460 may include a plurality of user profiles, each associated with a respective user 120. A user profile may indicate various information about a respective user 120 including the user's preferences (e.g., for music, comfort settings), frequented/past destinations, past routes, etc. The user profiles may be stored in a secure database. In some implementations, when a user 120 enters the vehicle 105, the user's key (or user device) may provide a signal with a user or key identifier to the vehicle 105. The vehicle 105 may transmit data indicative of the identifier (e.g., via its communications unit 325) to the computing platform 110. The computing platform 110 may look-up the user profile of the user 120 based on the identifier and transmit user profile data 460 to the vehicle computing system 200 of the vehicle 105. The vehicle computing system 200 may utilize the user profile data 460 to implement preferences of the user 120, present past destination locations, etc. The user profile data 460 may be updated based on information periodically provided by the vehicle 105. In some implementations, the user profile data 460 may be provided to the user device 115.

Figure 5:
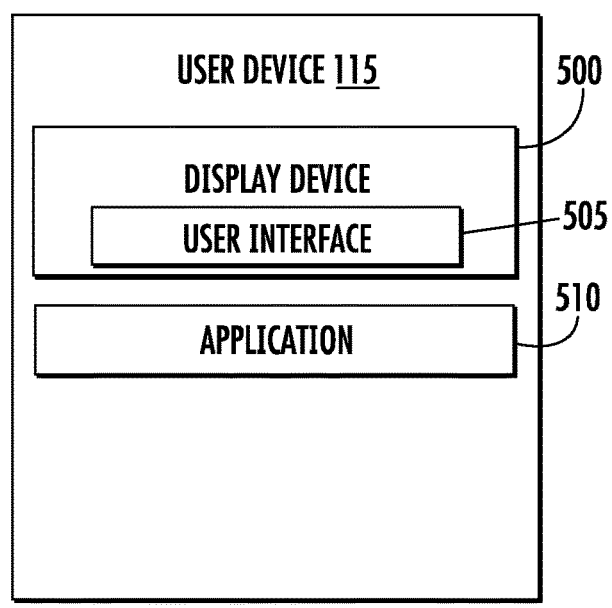
FIG. 5 illustrates a diagram of an example user device according to an embodiment hereof.

FIG. 5 illustrates a diagram of example components of user device 115 according to an embodiment hereof. The user device 115 may include a display device 500 configured to render content via a user interface 505 for presentation to a user 120. The display device 500 may include a display screen, CRT, LCD, plasma screen, touch screen, TV, projector, tablet, or other suitable display components. The user device 115 may include a software application 510 that is downloaded and runs on the user device 115. In some implementations, the software application 510 may be associated with the vehicle 105 or an entity associated with the vehicle 105 (e.g., manufacturer, retailer, maintenance provider). In an example, the software application 510 may enable the user device 115 to communicate with the computing platform 110 and the services thereof.

The technology of the present disclosure allows the vehicle computing system 200 to monitor a battery onboard the vehicle 105 while the vehicle is in an off state. More particularly, the vehicle computing system 200 may determine that a thermal event in the battery occurred while the vehicle is in the off state and use the network 130 to send notifications when the thermal event occurred to computing devices remote from the vehicle 105 (e.g., the user device 115). As described herein, this technology can extend the ability of the vehicle 105 to detect a thermal event during both an on state and an off state of the vehicle 105 and to notify other computing devices of the thermal event.

Figure 6:
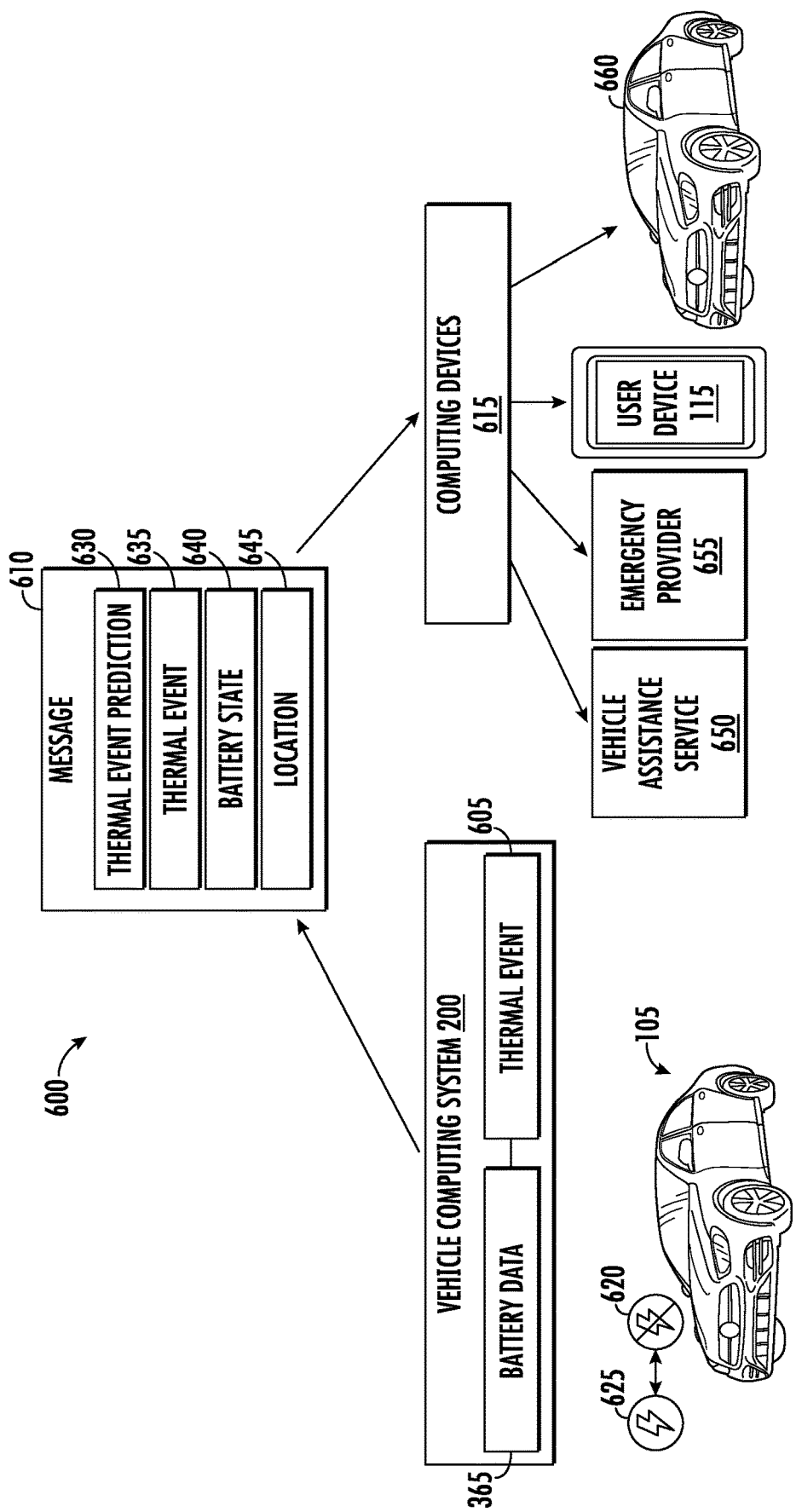
FIG. 6 illustrates a diagram of an example system for thermal event monitoring and notification according to an embodiment hereof.

FIG. 6 illustrates a diagram of an example system 600 for thermal event monitoring and notification according to an embodiment hereof. The vehicle 105 may be configured to obtain the battery data 365 while the vehicle 105 is in an off state 620. The off state 620 can include a state where the battery of the vehicle 105 is not powered, such as when the vehicle 105 is turned off and when the vehicle 105 is parked. The battery data 365 can be indicative of a state of a battery onboard the vehicle 105. For instance, the battery management system 360 may monitor the battery temperature (e.g., via sensors of the vehicle 105 and the sensor systems 305) while the vehicle 105 is in the off state 620 and the battery data 365 can indicate that the battery is overheating when the battery temperature is above a threshold.

The battery data 365 can be obtained from the battery management system 360 of the vehicle computing system 200 while the vehicle 105 is in the off state 620. For instance, the battery data 365 may be shared between the battery management system 360 and other components of the vehicle computing system 200 while the vehicle 105 is in the off state 620. As a result, components of the vehicle computing system 200, such as the communications unit 325, can utilize the battery data 365 to send information about the battery to computing devices. Based on the battery data 365, the vehicle 105 (e.g., the battery management system 360) can determine that a thermal event 605 has occurred onboard the vehicle 105 while when the vehicle 105 is in the off state 620.

The vehicle 105 may be configured to determine that the vehicle 105 has transitioned from the on state 625 to the off state 620. For instance, the vehicle 105 may determine that the vehicle 105 is turned off and the battery is not receiving power (e.g., via the battery management system 360). When the vehicle 105 is in the on state 625, the vehicle 105 may be in a first battery monitoring mode. When the vehicle 105 is in the off state 620, the vehicle 105 may be in a second battery monitoring mode that differs from the first battery monitoring mode. The vehicle 105 may be configured to output the message 610 to the computing devices 615 remote from the vehicle 105 when the vehicle 105 is in the second battery monitoring mode.

In response to determining that the thermal event 605 has occurred, the vehicle 105 (e.g., the battery management system 360) may generate a message 610 associated with the battery of the vehicle 105 that corresponds to the thermal event 605. The message 610 may be indicative of at least one of the thermal event 635, the state 640 of the battery, or the location 645 of the vehicle 105 (e.g., based on the location data 320). For example, the message 610 may indicate that the state 640 of the battery is that the battery is overheating, that the thermal event 635 is thermal runaway, and that the location 645 of the vehicle 105 is at a set of coordinates (e.g., latitude, longitude).

Thermal runaway can be detected by the battery management system 360 by measuring characteristics of a battery, such as voltage, temperature, and gas levels, which may be stored as the battery data 365. For example, a voltage or current decrease or an impedance fluctuation may be detected by sensors in the battery (e.g., sensors of the vehicle 105 and the sensor systems 305) and the battery management system 360 may determine that the voltage or current is anomalous and can cause thermal runaway. In another example, the sensors may measure the temperature of a battery or a battery cell and the battery management system 360 may determine that the temperature is at a level where thermal runaway may occur. For example, a battery may operate at a temperature between 77-100 degrees Fahrenheit or 25-37 degrees Celsius. A temperature measured by the sensors that is at the upper end of this range (e.g., 95 degrees Fahrenheit) or above this range may cause the battery management system 360 to determine that thermal runaway may occur. Thermal runaway can also be detected by sensors in a battery that detect gases and the battery management system 360 can use the information about the detected gases to determine that the gases may cause thermal runaway. For example, the sensors may detect any type of gas accumulation and the battery management system 360 may determine that thermal runaway may occur due to the gas accumulation. In another example, the sensors may measure the pressure of a battery or a battery cell and the battery management system 360 may determine that thermal runaway may occur when there is any detection by the sensors of battery pressure increase.

In some implementations, a threshold (e.g., temperature, gas accumulation, pressure, etc.) for detecting a thermal event may depend on the state of the vehicle. For example, the temperature threshold for detecting a thermal event in an on state may be different than a temperature threshold for detecting a thermal event in an off state. In an on state, the temperature may range between 75-100 F, while the high voltage of the vehicle is active/the vehicle is on. The temperature threshold for detecting a thermal event may be higher for the on state than for an off state, while the high voltage of the vehicle is inactive/the vehicle is off. The battery management system 360 may switch its threshold monitoring depending on the state of the vehicle. For example, the battery management system 360 may monitor for a first threshold for the on state and a second threshold for the off state. The battery management system 360 may access a look-up table that indicates the respective thresholds when transition between its modes to implement the appropriate thresholds.

The vehicle 105 (e.g., the communications unit 325) may output the message 610 to one or more computing devices 615 remote from the vehicle 105. The computing devices 615 remote from the vehicle 105 can include at least one of a vehicle assistance service 650, an emergency provider 655, the user device 115 associated with the user 120, or a computing system onboard another vehicle 660. For example, the message 610 may be sent over the air from the vehicle 105 to the user device 115 associated with the user 120 of the vehicle 105 and to the emergency provider 655 to provide assistance at the location of the vehicle 105. The computing devices 615 remote from the vehicle 105 can also include a plurality of user devices associated with users of the vehicle. For instance, the message 610 may be sent over the air from the vehicle 105 (e.g., the communications unit 325) to the user devices (e.g., computers, phones, laptops, tablets, wearable devices, etc.) associated with the driver and the passengers of the vehicle 105. In some implementations, the user 120, such as the owner of the vehicle 105, can use a mobile application associated with the vehicle 105 to identify the users and user devices to send the message 610 to when the thermal event 605 occurs. In other implementations, users in addition to the owner of the vehicle 105 can use a mobile application associated with the vehicle 105 to configure their user device 115 to receive the message 610 when the thermal event 605 occurs onboard the vehicle 105.

For example, the vehicle 105 may be parked overnight in a home garage of the vehicle owner when the vehicle 105 determines that the thermal event 605 occurred onboard the vehicle 105. The message 610 can be generated and sent to the user device 115 of the owner and to the emergency provider 655 so that the owner can contact emergency services, etc.

In another example, the vehicle 105 may be in a manufacturing plant or in a fleet of parked vehicles, where the occurrence of the thermal event 605 onboard the vehicle 105 can affect other vehicles that are close by if a fire occurs due to the thermal event 605. The vehicle 105 can determine that the thermal event 605 occurred and the message 610 can be generated and sent to the user device 115 of the plant owner, plant employees, fleet owner, or another user, and to computing systems onboard the other vehicles in the manufacturing plant and the fleet, so that the other vehicles can be moved away from the vehicle 105 with the thermal event 605.

In some implementations, a signal may be output (e.g., by the vehicle computing system 200) to transition the vehicle 105 to an on state 625 or an awake state. For example, the message 610 may be output to the display device 345, which may be a component of the vehicle's head unit or infotainment system. The display device 345 may require power in order to display the message 610. In this example, the signal can be output to transition the vehicle 105 to the on state 625 in order for the message 610 to be displayed on the display device 345. In some examples, a sound, such as the vehicle 105 horn or an internal buzzer, can sound in addition to the message 610 to be displayed on the display device 345. Transitioning the vehicle 105 to the on state 625 in order to display the message 610 on the display device 345 can allow users who are in the vehicle 105 while the vehicle 105 is in the off state 620 and parked to leave the vehicle 105 when the thermal event 605 occurs onboard the vehicle 105. Transitioning the vehicle 105 to the on state 625 can also provide power to the vehicle 105 to allow the vehicle computing system 200 to take steps to mitigate the thermal event 605, such as cooling the battery of the vehicle 105.

In some examples, the vehicle 105 (e.g., the battery management system 360) may be configured to predict that the thermal event 605 will occur. The vehicle 105 (e.g., the communications unit 325) may output the message 610 to the one or more computing devices 615 remote from the vehicle 105, and the message 610 can be an initial message with a thermal event prediction 630 that indicates that the thermal event 605 is predicted to occur. For example, the battery management system 360 may monitor the battery temperature (e.g., via sensors of the vehicle 105 and the sensor systems 305) while the vehicle 105 is in the off state 620 and the battery data 365 can indicate that the battery temperature is reaching a threshold level where the thermal event 605 is predicted to occur. In another example, sensors (e.g., the sensor system 305) may detect that the battery of the vehicle 105 has been punctured and that the thermal event 605 is predicted to occur due to the damage to the battery. The message 610 can be output to the one or more computing devices 615 remote from the vehicle 105 and include the thermal event prediction 630 indicating that the thermal event 605 is predicted to occur, allowing for more time to take action before the thermal event 605 occurs.

Figure 7:
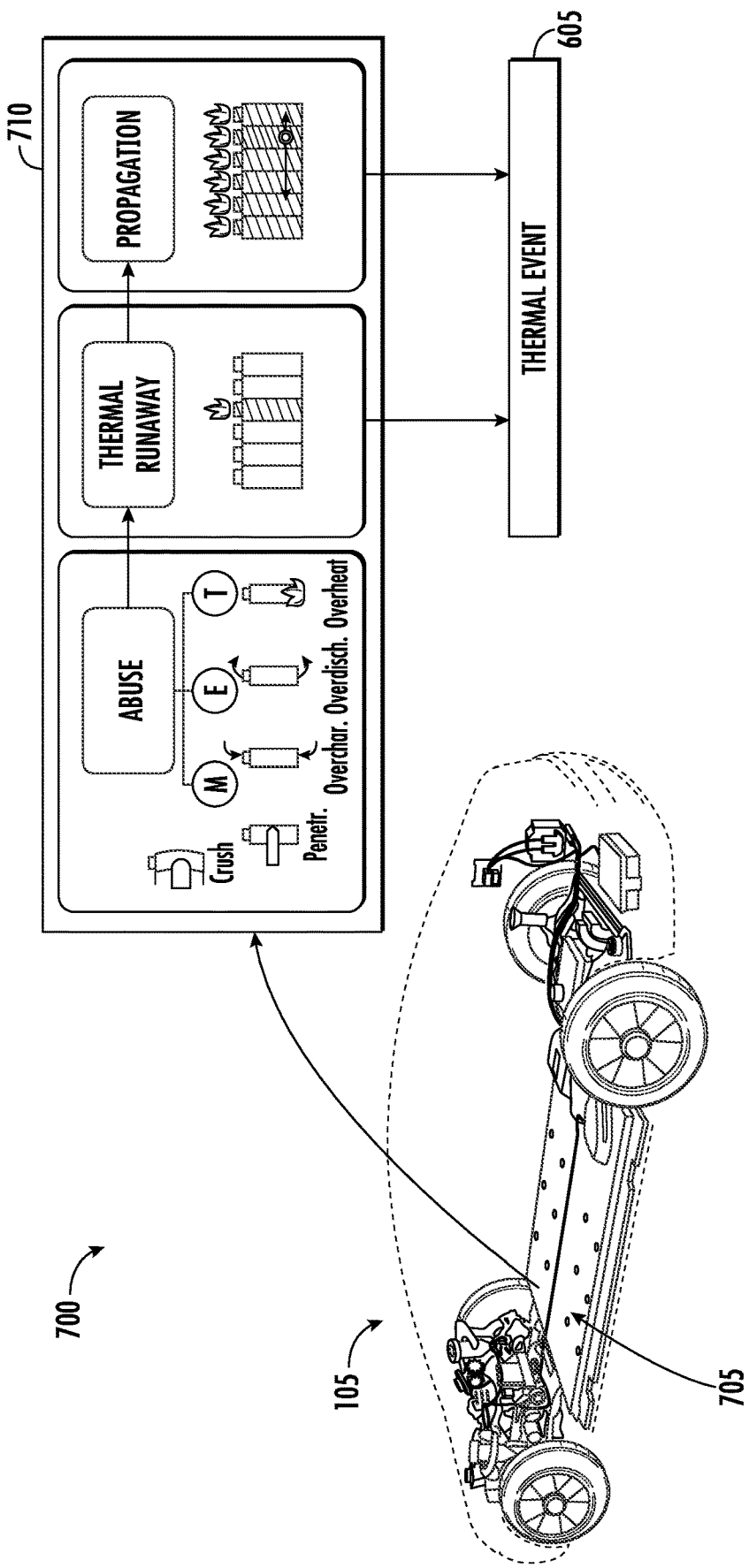
FIG. 7 illustrates a diagram of an example thermal event monitoring of a vehicle battery according to an embodiment hereof.

FIG. 7 illustrates a diagram of an example thermal event monitoring 700 of a vehicle battery according to an embodiment hereof. The thermal event 605 may be thermal runaway 710. A battery 705 of the vehicle 105 can generate heat as the battery 705 is being used. Thermal runaway 710 may occur when the temperature of a battery cell of the battery 705 of the vehicle 105 increases uncontrollably. Thermal runaway 710 can be caused by a variety of factors, such as mechanical issues (e.g., a punctured battery cell), electrical issues (e.g., overcharging), or thermal issues (e.g., overheating). Thermal runaway 710 can further cause thermal propagation when the thermal runaway 710 in one battery cell of the battery 705 of the vehicle 105 spreads to other battery cells of the battery 705.

While the vehicle 105 is in the off state 620, the vehicle 105 (e.g., the battery management system 360) can determine that the thermal event 605 of thermal runaway 710 occurred onboard the vehicle 105. The vehicle 105 (e.g., the battery management system 360) can generate the message 610 associated with the battery 705 of the vehicle 105 that corresponds to the thermal runaway 710 and output the message 610 to the computing devices 615 remote from the vehicle 105. In this manner, others (e.g., the user 120, the vehicle assistance service 650, the emergency provider 655, etc.) can be alerted and take an appropriate action. Notification at the time of the thermal runaway 710 can allow for a quick response before thermal propagation occurs.

Figure 8:
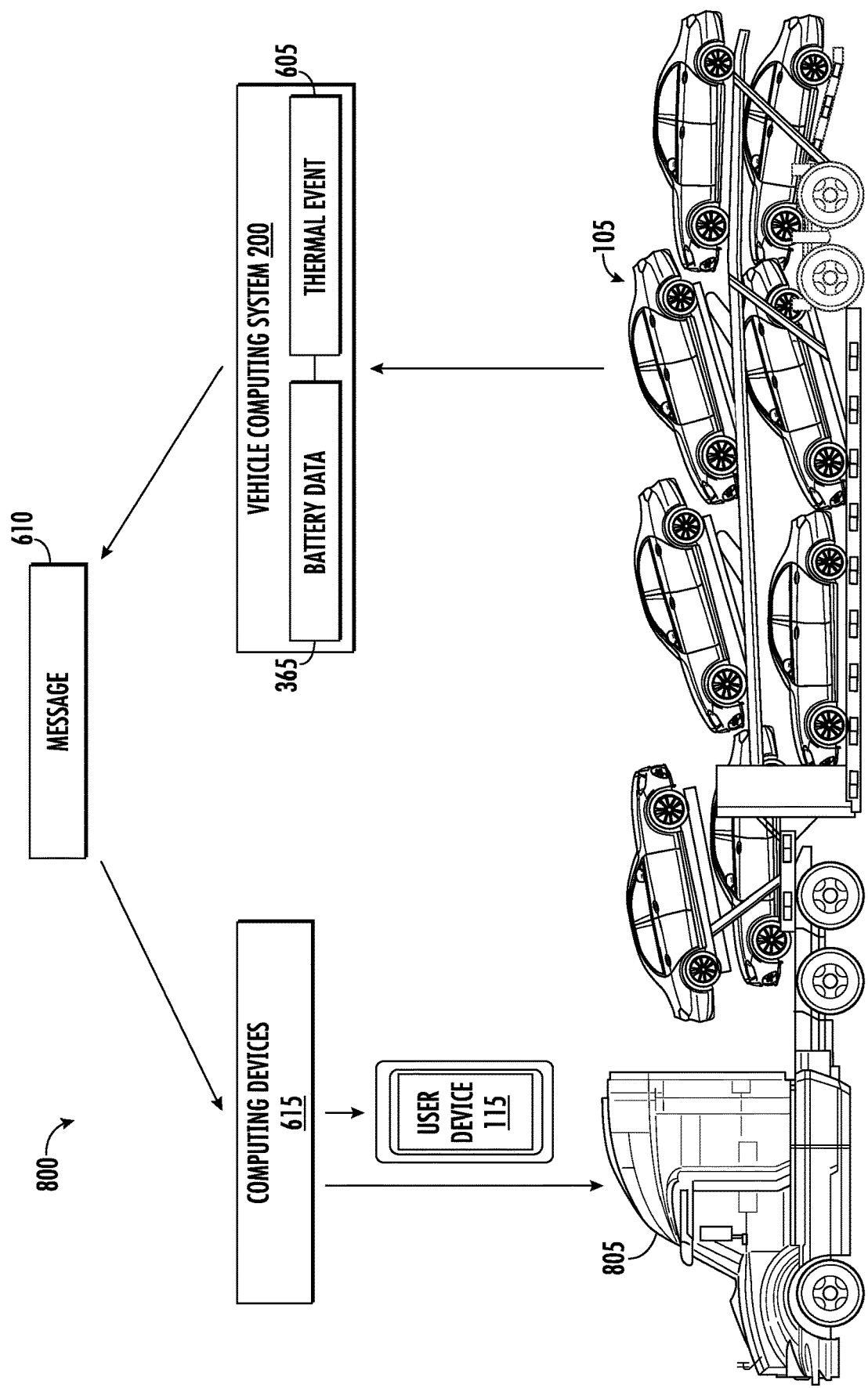
FIG. 8 illustrates a diagram of an example system for thermal event monitoring and notification according to an embodiment hereof.

FIG. 8 illustrates a diagram of an example system 800 for thermal event monitoring and notification according to an embodiment hereof. In the example of FIG. 8, the vehicle 105 may be transported by another vehicle 805. The other vehicle 805 may be, for example, a vehicle with a trailer, a car carrier trailer, or a semi-trailer truck, that is transporting the vehicle 105. While the vehicle 105 is in the off state 620 on the other vehicle 805, the vehicle 105 (e.g., the battery management system 360) may determine, based on the battery data 365 of the vehicle computing system 200, that the thermal event 605 occurred onboard the vehicle 105.

The vehicle 105 (e.g., the battery management system 360) can generate the message 610 associated with the battery of the vehicle 105 that corresponds to the thermal event 605 and output the message 610 to the computing devices 615 remote from the vehicle 105, which can include a computing device onboard the other vehicle 805 or a user device 115 of an operator of the other vehicle 805. For example, a car carrier trailer may be transporting vehicles with batteries, such as the vehicle 105, and the operator of the car carrier trailer can receive the message 610 on their user device 115 when the thermal event 605 occurs onboard one of the vehicles being transported so that the operator can take an appropriate action. The user device 115 of the operator of the other vehicle 805 may have an application that identifies the vehicles that are being transported on the other vehicle 805. For instance, the operator can use the user device 115 to scan a QR code or VIN of each vehicle being transported in order for the operator to receive a message 610 on the user device 115 when one of the vehicles being transported experiences a thermal event 605. In another example, the message 610 may be output to a computing system, such as a display device, of the other vehicle 805 that is transporting the vehicles so that the operator can move the other vehicle 805 off the road or away from other vehicles when the thermal event 605 occurs onboard one of the vehicles being transported.

Figure 9:
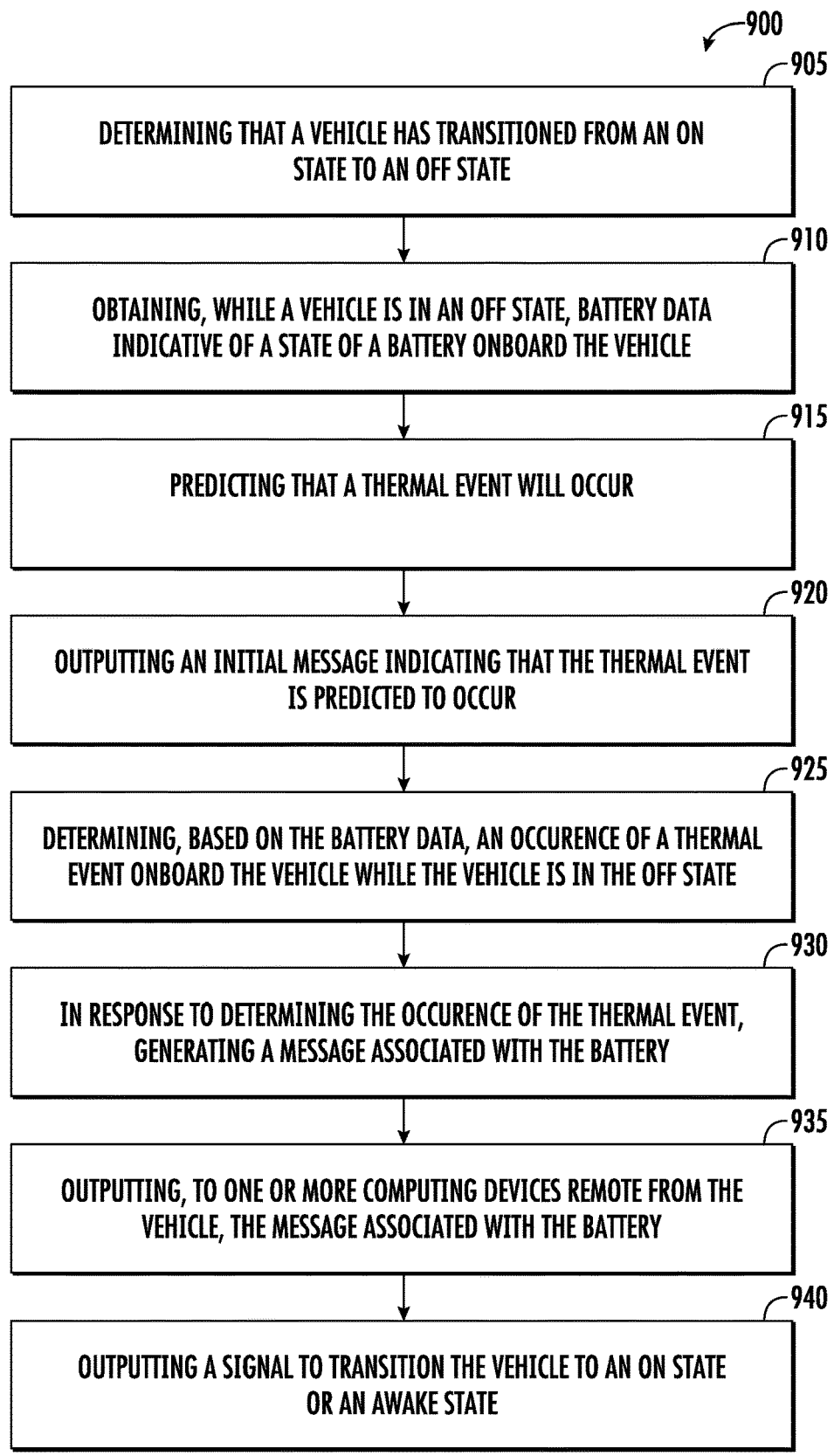
FIG. 9 illustrates a flowchart diagram of an example method according to an embodiment hereof.

FIG. 9 illustrates a flowchart diagram of an example method 900 for thermal event monitoring and notification according to an embodiment hereof. The method 900 may be performed by a computing system described with reference to the other figures. In an embodiment, the method 900 may be performed by the control circuit of the vehicle computing system 200 of FIG. 1. One or more portions of the method 900 may be implemented as an algorithm on the hardware components of the devices described herein (e.g., as in FIGS. 1-8 and 10, etc.). For example, the steps of method 900 may be implemented as operations/instructions that are executable by computing hardware.

FIG. 9 illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 9 is described with reference to elements/terms described with respect to other systems and figures for example illustrated purposes and is not meant to be limiting. One or more portions of method 900 may be performed additionally, or alternatively, by other systems. For example, method 900 may be performed by a control circuit of the computing platform 110.

In an embodiment, the method 900 may begin with or otherwise include an operation 905, in which, the vehicle computing system 200 may determine that the vehicle 105 has transitioned from an on state 625 to the off state 620. For instance, a user 120 may park a vehicle 105 in the user's garage. As such, the vehicle 105 may be in a parked state. The user 120 may turn off the vehicle 105 such that the vehicle transitions from an on state 625 to an off state 620. The vehicle computing system 200 may detect this transition by monitoring one or more components of the vehicle 105 and determining that power is not being supplied to such components.

The method 900 in an embodiment may include an operation 910, in which the vehicle computing system 200 may obtain, while the vehicle 105 is in an off state 620, battery data 365 indicative of a state of a battery 705 onboard the vehicle 105. For instance, the vehicle 105 may be in a first battery monitoring mode when the vehicle 105 is in the on state 625 and a second battery monitoring mode when the vehicle 105 is in the off state 620, the second battery monitoring mode being different from the first battery monitoring mode. For example, the user 120 may turn off the vehicle 105 after parking the vehicle 105 in the user's garage, such that the vehicle 105 is in the off state 620. The vehicle computing system 200 of the vehicle 105 may obtain battery data 365 indicating that the state of the battery 705 onboard the vehicle is such that the battery 705 is in a second battery monitoring mode because the vehicle 105 is in the off state 620.

The vehicle 105 may be configured differently when in the different modes, as described herein. For example, a message 610 associated with the battery 705 may be output to the one or more computing devices 615 remote from the vehicle 105 when the vehicle 105 is in the second battery monitoring mode. This may be different from an on state 625, in which the message 610 may alternatively, or additionally, be transmitted to a head unit 347 of the vehicle 105.

The method 900 in an embodiment may include an operation 915, in which the vehicle computing system 200 may predict that a thermal event 605 will occur. The thermal event 605 may be a thermal runaway 710 event. For instance, sensors (e.g., the sensor system 305) in the battery 705 may measure voltage, temperature, and gas levels of the battery and the vehicle computing system 200 (e.g., the battery management system 360) may use this data about the battery 705 (e.g., the battery data 365) to predict that a thermal event 605 will occur. For example, the vehicle 105 may be parked and in an off state 620 in the user's garage. The temperature of the battery 705 of the vehicle 105 may be monitored by sensors of the vehicle 105 and the vehicle computing system 200 may detect that the temperature of the battery 705 is reaching a threshold level, such as at the upper end of the normal operating temperature range for the battery 705, where the thermal event 605 is predicted to occur.

The method 900 in an embodiment may include an operation 920, in which the vehicle computing system 200 may output an initial message 610 indicating that the thermal event 605 is predicted to occur. The initial message 610 with the thermal event 605 prediction can be output to the computing devices 615 remote from the vehicle 105. For instance, the vehicle computing system 200 may detect that the temperature of the battery 705 of the vehicle 105 that is parked and in the off state 620 in the garage of the user 120 is reaching a threshold level where a thermal event 605 is predicted to occur. Additionally, or alternatively, the vehicle computing system 200 may determine that the rate of change in the battery temperature is at a certain level (or is increasing) such that it appears the battery is approaching a thermal event. For example, the vehicle computing system 200 may determine that the temperature of the battery 705 increased by 25% in under five seconds and that a thermal event 605 is predicted to occur due to the temperature increase. The vehicle computing system 200 may output an initial message 610 to a computing device belonging to the user 120, such as a phone, and the message 610 may indicate that the thermal event 605 is predicted to occur in the vehicle 105.

The method 900 in an embodiment may include an operation 925, in which the vehicle computing system 200 may determine, based on the battery data 365, an occurrence of a thermal event 605 onboard the vehicle 105 while the vehicle 105 is in the off state 620. The thermal event 605 may be a thermal runaway 710 event.

By way of example, sensors in the battery 705 of the vehicle 105 that is parked and in the off state 620 in the garage of the user 120 may measure voltage, temperature, and gas levels of the battery 705, which may be stored as battery data 365. Sensors in the battery cells of the battery 705 of the vehicle 105 may measure the temperature of a battery cell and the gas levels of the battery cell, as well as the temperature and gas levels of the battery cells adjacent to the battery cell. The vehicle computing system 200 (e.g., the battery management system 360) may access the battery data 365 that includes the temperature and gas levels of the battery cells and determine that the temperature and gas levels of the battery cell and the adjacent battery cells are at a level where thermal runaway 710 has occurred in the battery 705 onboard the vehicle 105.

The method 900 in an embodiment may include an operation 930, in which the vehicle computing system 200, in response to determining the occurrence of the thermal event 605, generates a message 610 associated with the battery 705. The message 610 may be indicative of the thermal event 635, the state 640 of the battery 705, or the location 645 of the vehicle 105. For instance, the vehicle 105 may be parked and in an off state 620 in the user's garage and the vehicle computing device 200 may determine that a thermal event 605 occurred onboard the vehicle 105 based on the battery data. The thermal event 605 may be thermal runaway 710 due to an overheating of the battery 705 of the vehicle 105. The vehicle computing device 200 can generate a message 610 that indicates that the state 640 of the battery is that the battery is overheating, that the thermal event 605 is thermal runaway 710, and that the location 645 of the vehicle 105 is at the user's home address.

The method 900 in an embodiment may include an operation 935, in which the vehicle computing system 200 outputs, to one or more computing devices 615 remote from the vehicle 105, the message 610 associated with the battery 705. The computing devices 615 remote from the vehicle 105 may include one or more user devices 115 associated with one or more users 120 of the vehicle 105, computing devices associated with a vehicle assistance service 650 or an emergency provider 655, or computing devices included in a computing system onboard another vehicle 660. For example, the vehicle computing device 200 may generate the message 610 that the state 640 of the battery is that the battery is overheating, that the thermal event 605 is thermal runaway 710, and that the location 645 of the vehicle 105 is at the user's home address where the vehicle 105 is parked in the garage, and the message 610 with this information can be output to a user device 115, such as a phone, of the user 120 and to an emergency provider 655. In some examples, where the vehicle 105 is being transported by another vehicle 805, the computing devices 615 remote from the vehicle 105 may include a computing device onboard the other vehicle 805 or a user device 115 of an operator of the other vehicle 805.

For example, the message 610 may be output to the user device 115 and the message 610 can include a hyperlink that will cause the user device 115 to call an emergency service 655. Additionally, or alternatively, a user 120 can review the message 610 output to the user device 115 and contact an emergency provider 655 by telephone or text. In another example, the cloud platform can process the message 610 and can transmit a request for emergency services to another system (e.g., of an emergency provider 655). Additionally, or alternatively, the cloud platform can wake up the vehicle 105, transmit the message 610 to the vehicle 105 for display on the display device 345 to notify passengers inside the vehicle 105 of the thermal event 605, and to take mitigation actions to stop the thermal event 605. In another example, the message 610 may be processed by an emergency service provider 655, which can dispatch emergency personnel in response thereto to the location 645 identified in the message 610. In another example, the message 610 may be processed by a vehicle assistance service 650 that can send personnel to assist with the vehicle 105. In some examples, the message 610 may be output to a computing system onboard another vehicle 660 and the message 610 can include information that will allow the passengers of the other vehicle 660 to move away from the vehicle 105 experiencing the thermal event 605.

In some examples, in operation 940, the vehicle computing system 200 may output a signal to transition the vehicle 105 to an on state 625 or an awake state. The on state 625 of the vehicle 105 can provide power to components of the vehicle, such as the head unit 347 and the display device 345 of the vehicle 105. In order to be able to display the message 610 on the display device 345 of the vehicle, the vehicle computing system 200 may output a signal to transition the vehicle 105 to the on state 625 and display the message 610 on the display device 345 to notify passengers to exit the vehicle 105. Transitioning the vehicle 105 to the on state 625 can provide power that can allow the vehicle computing system 200 to take mitigation actions to attempt to stop the thermal event 605. For instance, the thermal event 605 may be thermal runaway 710 due to overheating of the battery 705 and the vehicle 105 may transition to the on state 620 in order for the vehicle computing system 200 to attempt to cool off the battery 705 to prevent the spread of the thermal runaway 710 to other cells of the battery 705.

Figure 10:
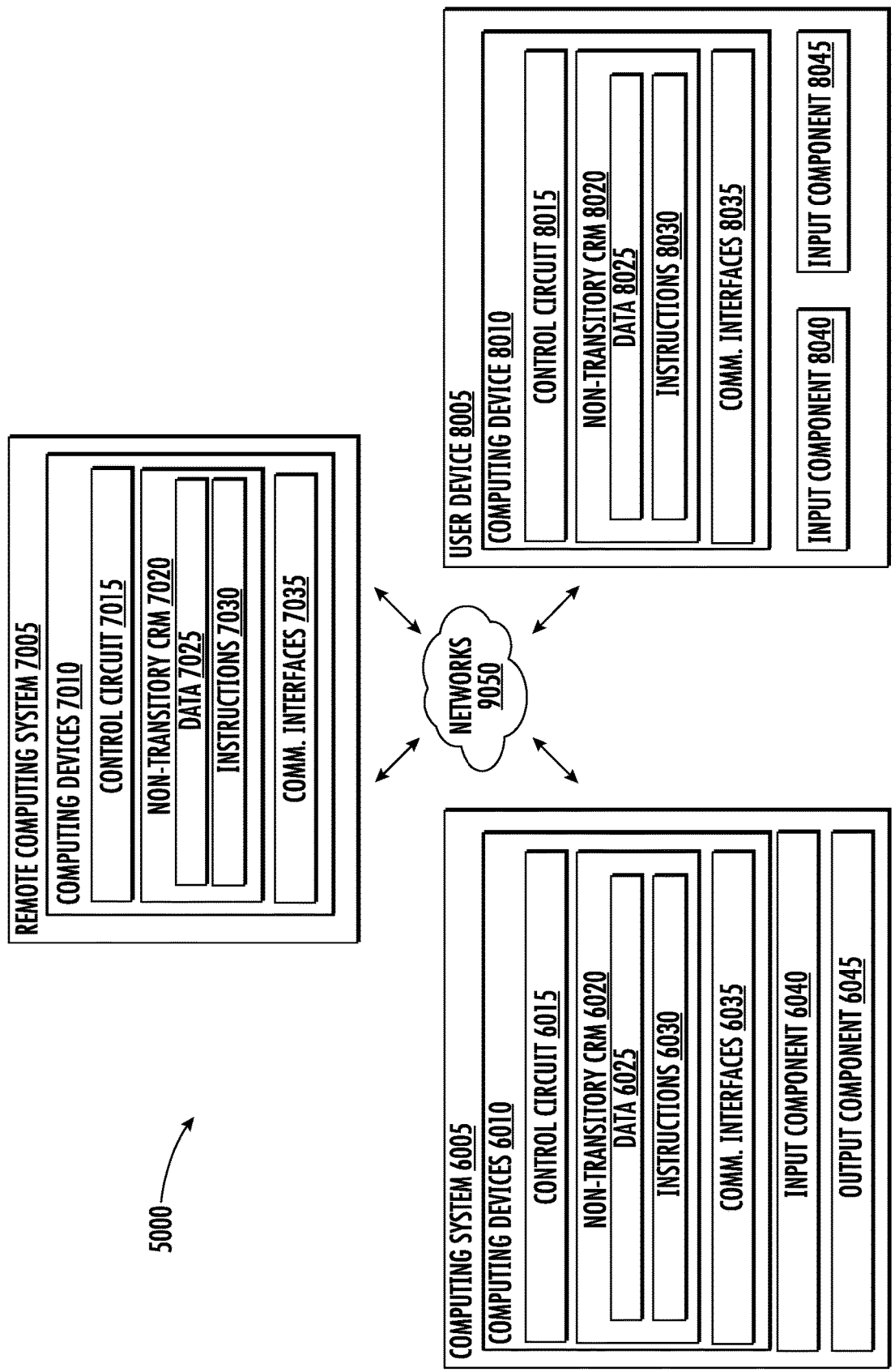
FIG. 10 illustrates a diagram of an example computing ecosystem with computing components according to an embodiment hereof.

FIG. 10 illustrates a block diagram of an example computing system 5000 according to an embodiment hereof. The system 5000 includes a computing system 6005 (e.g., a computing system onboard a vehicle), a server computing system 7005 (e.g., a remote computing system, cloud computing platform), and a user device 8005 that are communicatively coupled over one or more networks 9050.

The computing system 6005 may include one or more computing devices 6010 or circuitry. For instance, the computing system 6005 may include a control circuit 6015 and a non-transitory computer-readable medium 6020, also referred to herein as memory. In an embodiment, the control circuit 6015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 6015 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 6015 may be programmed by one or more computer-readable or computer-executable instructions stored on the non-transitory computer-readable medium 6020.

In an embodiment, the non-transitory computer-readable medium 6020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 6020 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 6020 may store information that may be accessed by the control circuit 6015. For instance, the non-transitory computer-readable medium 6020 (e.g., memory devices) may store data 6025 that may be obtained, received, accessed, written, manipulated, created, and/or stored. The data 6025 may include, for instance, any of the data or information described herein. In some implementations, the computing system 6005 may obtain data from one or more memories that are remote from the computing system 6005.

The non-transitory computer-readable medium 6020 may also store computer-readable instructions 6030 that may be executed by the control circuit 6015. The instructions 6030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 6015 to perform one or more functional tasks. The modules and computer-readable/executable instructions may be described as performing various operations or tasks when the control circuit 6015 or other hardware component is executing the modules or computer-readable instructions.

The instructions 6030 may be executed in logically and/or virtually separate threads on the control circuit 6015. For example, the non-transitory computer-readable medium 6020 may store instructions 6030 that when executed by the control circuit 6015 cause the control circuit 6015 to perform any of the operations, methods and/or processes described herein. In some cases, the non-transitory computer-readable medium 6020 may store computer-executable instructions or computer-readable instructions, such as instructions to perform at least a portion of the method of FIG. 9.

The computing system 6005 may include one or more communication interfaces 6035. The communication interfaces 6035 may be used to communicate with one or more other systems. The communication interfaces 6035 may include any circuits, components, software, etc. for communicating via one or more networks (e.g., networks 9050). In some implementations, the communication interfaces 6035 may include for example, one or more of a communications controller, receiver, transceiver, transmitter, port, conductors, software and/or hardware for communicating data/information.

The computing system 6005 may also include one or more user input components 6040 that receives user input. For example, the user input component 6040 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 6005 may include one or more output components 6045. The output components 6045 may include hardware and/or software for audibly or visually producing content. For instance, the output components 6045 may include one or more speakers, earpieces, headsets, handsets, etc. The output components 6045 may include a display device, which may include hardware for displaying a user interface and/or messages for a user. By way of example, the output component 6045 may include a display screen, CRT, LCD, plasma screen, touch screen, TV, projector, tablet, and/or other suitable display components.

The server computing system 7005 may include one or more computing devices 7010. In an embodiment, the server computing system 7005 may include or is otherwise implemented by one or more server computing devices. In instances in which the server computing system 7005 includes plural server computing devices, such server computing devices may operate according to sequential computing architectures, parallel computing architectures, or some combination thereof.

The server computing system 7005 may include a control circuit 7015 and a non-transitory computer-readable medium 7020, also referred to herein as memory 7020. In an embodiment, the control circuit 7015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 7015 may be programmed by one or more computer-readable or computer-executable instructions stored on the non-transitory computer-readable medium 7020.

In an embodiment, the non-transitory computer-readable medium 7020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 7020 may store information that may be accessed by the control circuit 7015. For instance, the non-transitory computer-readable medium 7020 (e.g., memory devices) may store data 7025 that may be obtained, received, accessed, written, manipulated, created, and/or stored. The data 7025 may include, for instance, any of the data or information described herein. In some implementations, the server computing system 7005 may obtain data from one or more memories that are remote from the server computing system 7005.

The non-transitory computer-readable medium 7020 may also store computer-readable instructions 7030 that may be executed by the control circuit 7015. The instructions 7030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 7015 to perform one or more functional tasks. The modules and computer-readable/executable instructions may be described as performing various operations or tasks when the control circuit 7015 or other hardware component is executing the modules or computer-readable instructions.

The instructions 7030 may be executed in logically and/or virtually separate threads on the control circuit 7015. For example, the non-transitory computer-readable medium 7020 may store instructions 7030 that when executed by the control circuit 7015 cause the control circuit 7015 to perform any of the operations, methods and/or processes described herein. In some cases, the non-transitory computer-readable medium 7020 may store computer-executable instructions or computer-readable instructions, such as instructions to perform at least a portion of the method of FIG. 9.

The server computing system 7005 may include one or more communication interfaces 7035. The communication interfaces 7035 may be used to communicate with one or more other systems. The communication interfaces 7035 may include any circuits, components, software, etc. for communicating via one or more networks (e.g., networks 9050). In some implementations, the communication interfaces 7035 may include for example, one or more of a communications controller, receiver, transceiver, transmitter, port, conductors, software and/or hardware for communicating data/information.

The computing system 6005 and/or the server computing system 7005 may also be in communication with a user device 8005 that is communicatively coupled over the networks 9050.

The user device 8005 may include one or more computing devices 8010. The user device 8005 may include a control circuit 8015 and a non-transitory computer-readable medium 8020, also referred to herein as memory 8020. In an embodiment, the control circuit 8015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 8015 may be programmed by one or more computer-readable or computer-executable instructions stored on the non-transitory computer-readable medium 8020.

In an embodiment, the non-transitory computer-readable medium 8020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 8020 may store information that may be accessed by the control circuit 8015. For instance, the non-transitory computer-readable medium 8020 (e.g., memory devices) may store data 8025 that may be obtained, received, accessed, written, manipulated, created, and/or stored. The data 8025 may include, for instance, any of the data or information described herein. In some implementations, the user device 8005 may obtain data from one or more memories that are remote from the user device 8005.

The non-transitory computer-readable medium 8020 may also store computer-readable instructions 8030 that may be executed by the control circuit 8015. The instructions 8030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 8015 to perform one or more functional tasks. The modules and computer-readable/executable instructions may be described as performing various operations or tasks when the control circuit 8015 or other hardware component is executing the modules or computer-readable instructions.

The instructions 8030 may be executed in logically or virtually separate threads on the control circuit 8015. For example, the non-transitory computer-readable medium 8020 may store instructions 8030 that when executed by the control circuit 8015 cause the control circuit 8015 to perform any of the operations, methods and/or processes described herein. In some cases, the non-transitory computer-readable medium 8020 may store computer-executable instructions or computer-readable instructions, such as instructions to perform at least a portion of the method of FIG. 9.

The user device 8005 may include one or more communication interfaces 8035. The communication interfaces 8035 may be used to communicate with one or more other systems. The communication interfaces 8035 may include any circuits, components, software, etc. for communicating via one or more networks (e.g., networks 9050). In some implementations, the communication interfaces 8035 may include for example, one or more of a communications controller, receiver, transceiver, transmitter, port, conductors, software and/or hardware for communicating data/information.

The user device 8005 may also include one or more user input components 8040 that receives user input. For example, the user input component 8040 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The user device 8005 may include one or more output components 8045. The output components 8045 may include hardware and/or software for audibly or visually producing content. For instance, the output components 8045 may include one or more speakers, earpieces, headsets, handsets, etc. The output components 8045 may include a display device, which may include hardware for displaying a user interface and/or messages for a user. By way of example, the output component 8045 may include a display screen, CRT, LCD, plasma screen, touch screen, TV, projector, tablet, and/or other suitable display components.

The one or more networks 9050 may be any type of communications network, such as a local area network (e.g., intranet), wide area network (e.g., Internet), or some combination thereof and may include any number of wired or wireless links. In general, communication over a network 9050 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

ADDITIONAL DISCUSSION OF VARIOUS EMBODIMENTS

Embodiment 1 relates to a computing system of a vehicle. In this embodiment, the computing system includes a control circuit configured to obtain, while the vehicle is in an off state, battery data indicative of a state of a battery onboard the vehicle. The control circuit is configured to determine, based on the battery data, an occurrence of a thermal event onboard the vehicle while the vehicle is in the off state. The control circuit is configured to in response to determining the occurrence of the thermal event, generate a message associated with the battery. The control circuit is configured to output, to one or more computing devices remote from the vehicle, the message associated with the battery.

Embodiment 2 includes the computing system of Embodiment 1. In this embodiment,
the thermal event is a thermal runaway event.

Embodiment 3 includes the computing system of any of embodiments 1 or 2. In this embodiment, the control circuit is further configured to determine that the vehicle has transitioned from an on state to the off state.

Embodiment 4 includes the computing system of any of embodiments 1 to 3. In this embodiment, the vehicle is in a first battery monitoring mode when the vehicle is in the on state and a second battery monitoring mode when the vehicle is in the off state. The second battery monitoring mode is different from the first battery monitoring mode. The control circuit is configured to output the message associated with the battery to the one or more computing devices remote from the vehicle when the vehicle is in the second battery monitoring mode.

Embodiment 5 includes the computing system of any of embodiments 1 to 4. In this embodiment, the vehicle is in a parked state.

Embodiment 6 includes the computing system of any of embodiments 1 to 5. In this embodiment, the message is indicative of the thermal event.

Embodiment 7 includes the computing system of any of embodiments 1 to 6. In this embodiment, the message is indicative of the state of the battery.

Embodiment 8 includes the computing system of any of embodiments 1 to 7. In this embodiment, the one or more computing devices remote from the vehicle are a plurality of user devices associated with users of the vehicle.

Embodiment 9 includes the computing system of any of embodiments 1 to 8. In this embodiment, the one or more computing devices remote from the vehicle are associated with a vehicle assistance service or an emergency provider.

Embodiment 10 includes the computing system of any of embodiments 1 to 9. In this embodiment, the one or more computing devices remote from the vehicle are included in a computing system onboard another vehicle.

Embodiment 11 relates to a computer-implemented method. In this embodiment, the computer-implemented method includes obtaining, while a vehicle is in an off state, battery data indicative of a state of a battery onboard the vehicle. The computer-implemented method includes determining, based on the battery data, an occurrence of a thermal event onboard the vehicle while the vehicle is in the off state. The computer-implemented method includes in response to determining the occurrence of the thermal event, generating a message associated with the battery. The computer-implemented method includes outputting, to one or more computing devices remote from the vehicle, the message associated with the battery.

Embodiment 12 includes the computer-implemented method of Embodiment 11. In this embodiment, the computer-implemented method includes determining that the vehicle has transitioned from an on state to the off state.

Embodiment 13 includes the computer-implemented method of any of Embodiment 11 or 12. In this embodiment, the computer-implemented method includes predicting that the thermal event will occur and outputting an initial message indicating that the thermal event is predicted to occur to the one or more computing devices remote from the vehicle.

Embodiment 14 includes the computer-implemented method of any of Embodiments 11 to 13. In this embodiment, the computer-implemented method includes outputting a signal to transition the vehicle to an on state or an awake state.

Embodiment 15 includes the computer-implemented method of any of Embodiments 11 to 14. In this embodiment, the one or more computing devices remote from the vehicle include at least one of: (i) a user device, (ii) a computing device associated with a vehicle assistance service, or (iii) a computing device associated with an emergency provider.

Embodiment 16 includes the computer-implemented method of any of Embodiments 11 to 15. In this embodiment, the one or more computing devices remote from the vehicle are a plurality of user devices associated with users of the vehicle.

Embodiment 17 includes the computer-implemented method of any of Embodiments 11 to 16. In this embodiment, the vehicle is being transported by another vehicle. The one or more computing devices remote from the vehicle are a computing device onboard the other vehicle or a user device of an operator of the other vehicle.

Embodiment 18 includes the computer-implemented method of any of Embodiments 11 to 17. In this embodiment, the message is indicative of at least one of: (i) the thermal event, or (ii) the state of the battery.

Embodiment 19 includes the computer-implemented method of any of Embodiments 11 to 18. In this embodiment, the message is indicative of a location of the vehicle.

Embodiment 20 relates to one or more non-transitory computer-readable media that store instructions that are executable by a control circuit to: obtain, while a vehicle is in an off state, battery data indicative of a state of a battery onboard the vehicle; determine, based on the battery data, an occurrence of a thermal event onboard the vehicle while the vehicle is in the off state; in response to determining the occurrence of the thermal event, generate a message associated with the battery; and output, to one or more computing devices remote from the vehicle, the message associated with the battery.

ADDITIONAL DISCLOSURE

As used herein, adjectives and their possessive forms are intended to be used interchangeably unless apparent otherwise from the context and/or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment may be used with another embodiment to yield a still further embodiment. Thus, it is intended that the present disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . , (i), (ii), (iii), . . . , etc. may be used to illustrate operations or different elements in a list. Such identifiers are provided for the case of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

What is claimed is:

1. A computing system of a vehicle comprising:
a control circuit configured to:
obtain, while the vehicle is in an off state, battery data indicative of a state of a battery onboard the vehicle;
determine, based on the battery data, an occurrence of a thermal event onboard the vehicle while the vehicle is in the off state, wherein the thermal event is determined by:
monitoring one or more threshold values associated with an on state for the vehicle and one or more threshold values associated with the off state for the vehicle, wherein the threshold values are different when the vehicle is in the on state and the off state; and
predicting the thermal event by implementing the appropriate threshold values;
in response to determining the occurrence of the thermal event, generate a message associated with the battery; and
output, to one or more computing devices remote from the vehicle, the message associated with the battery.

2. The computing system of claim 1, wherein the thermal event comprises a thermal runaway event.

3. The computing system of claim 1, wherein the control circuit is further configured to:
determine that the vehicle has transitioned from an on state to the off state.

4. The computing system of claim 3, wherein the vehicle is in a first battery monitoring mode when the vehicle is in the on state and a second battery monitoring mode when the vehicle is in the off state, the second battery monitoring mode being different from the first battery monitoring mode, and
wherein the control circuit is configured to output the message associated with the battery to the one or more computing devices remote from the vehicle when the vehicle is in the second battery monitoring mode.

5. The computing system of claim 1, wherein the vehicle is in a parked state.

6. The computing system of claim 1, wherein the message is indicative of the thermal event.

7. The computing system of claim 1, wherein the message is indicative of the state of the battery.

8. The computing system of claim 1, wherein the one or more computing devices remote from the vehicle comprises a plurality of user devices associated with users of the vehicle.

9. The computing system of claim 1, wherein the one or more computing devices remote from the vehicle are associated with a vehicle assistance service or an emergency provider.

10. The computing system of claim 1, wherein the one or more computing devices remote from the vehicle are included in a computing system onboard another vehicle.

11. A computer-implemented method comprising:
obtaining, while a vehicle is in an off state, battery data indicative of a state of a battery onboard the vehicle, wherein the vehicle is being transported by another vehicle;
determining, based on the battery data, an occurrence of a thermal event onboard the vehicle while the vehicle is in the off state;
in response to determining the occurrence of the thermal event, generating a message associated with the battery; and
outputting, to one or more computing devices remote from the vehicle, the message associated with the battery, wherein the one or more computing devices remote from the vehicle comprise a computing device onboard the other vehicle or a user device of an operator of the other vehicle.

12. The computer-implemented method of claim 11, further comprising:
determining that the vehicle has transitioned from an on state to the off state.

13. The computer-implemented method of claim 11, further comprising:
predicting that the thermal event will occur; and
outputting, to the one or more computing devices remote from the vehicle, an initial message indicating that the thermal event is predicted to occur.

14. The computer-implemented method of claim 11, further comprising:
outputting a signal to transition the vehicle to an on state or an awake state.

15. The computer-implemented method of claim 11, wherein the one or more computing devices remote from the vehicle comprise at least one of: (i) a user device, (ii) a computing device associated with a vehicle assistance service, or (iii) a computing device associated with an emergency provider.

16. The computer-implemented method of claim 11, wherein the one or more computing devices remote from the vehicle comprise a plurality of user devices associated with users of the vehicle.

17. The computer-implemented method of claim 11, wherein the message is indicative of at least one of: (i) the thermal event, or (ii) the state of the battery.

18. The computer-implemented method of claim 11, wherein the message is indicative of a location of the vehicle.

19. One or more non-transitory computer-readable media that store instructions that are executable by a control circuit to:
obtain, while a vehicle is in an off state, battery data indicative of a state of a battery onboard the vehicle;
determine, based on the battery data, an occurrence of a thermal event onboard the vehicle while the vehicle is in the off state, wherein the thermal event is determined by:
monitoring one or more threshold values associated with an onstate for the vehicle and one or more threshold values associated with the off state for the vehicle, wherein the threshold values are different when the vehicle is in the on state and the off state; and
predicting the thermal event by implementing the appropriate threshold values;
in response to determining the occurrence of the thermal event, generate a message associated with the battery; and
output, to one or more computing devices remote from the vehicle, the message associated with the battery.

20. The computing system of claim 1, wherein the one or more thresholds is indicative of at least one of: i) operating temperature range for the battery, ii) gas levels of the battery cell, iii) pressure of the battery or battery cell, iv) charge level, v) voltage, vi) capacity, vii) leakage, viii) gas levels, ix) internal resistance, or x) state of the battery case.

* * * * *